United States Patent
Dong

(10) Patent No.: US 10,621,528 B2
(45) Date of Patent: Apr. 14, 2020

(54) AUTOMATIC AND SELF-MANAGING SUBSCRIPTION COMMERCE SYSTEM

(71) Applicant: Yue Dong, Markham (CA)

(72) Inventor: Yue Dong, Markham (CA)

( * ) Notice: Subject to any disclaimer, the term of this patent is extended or adjusted under 35 U.S.C. 154(b) by 245 days.

(21) Appl. No.: 15/328,626

(22) PCT Filed: Jul. 24, 2015

(86) PCT No.: PCT/CA2015/050701
§ 371 (c)(1),
(2) Date: Jan. 24, 2017

(87) PCT Pub. No.: WO2016/015145
PCT Pub. Date: Feb. 4, 2016

(65) Prior Publication Data
US 2017/0213173 A1    Jul. 27, 2017

Related U.S. Application Data

(60) Provisional application No. 62/110,487, filed on Jan. 31, 2015, provisional application No. 62/029,440, filed on Jul. 26, 2014.

(51) Int. Cl.
*G06Q 10/08* (2012.01)
*G06Q 10/06* (2012.01)
*G06K 7/10* (2006.01)

(52) U.S. Cl.
CPC ..... *G06Q 10/06315* (2013.01); *G06Q 10/087* (2013.01); *G06K 7/10297* (2013.01)

(58) Field of Classification Search
None
See application file for complete search history.

(56) References Cited

U.S. PATENT DOCUMENTS

| | | | |
|---|---|---|---|
| 5,949,335 A | 9/1999 | Maynard | |
| 5,963,134 A | 10/1999 | Bowers et al. | |
| 6,184,818 B1 * | 2/2001 | Meinel | G01F 23/284 324/642 |
| 6,725,232 B2 | 4/2004 | Bradley et al. | |
| 7,113,125 B2 * | 9/2006 | Le Sesne | G01F 23/284 342/124 |
| 7,362,228 B2 | 4/2008 | Nycz et al. | |
| 7,516,890 B1 | 4/2009 | Spremo et al. | |
| 7,839,289 B2 * | 11/2010 | Chung | G01S 5/0018 340/10.4 |
| 8,004,387 B2 | 8/2011 | Childress et al. | |
| 8,006,903 B2 | 8/2011 | Braun et al. | |
| 8,085,150 B2 | 12/2011 | Oberle | |
| 8,231,053 B2 | 7/2012 | Linton et al. | |
| 8,242,914 B2 | 8/2012 | Matityaho | |
| 8,322,955 B2 | 12/2012 | Amesen et al. | |
| 8,346,574 B2 | 1/2013 | Chirica et al. | |
| 8,378,789 B2 | 2/2013 | Moore | |

(Continued)

*Primary Examiner* — Sarah B McPartlin

(57) ABSTRACT

A monitoring system configured to automatically detect that an amount of items in an environment has fallen below a threshold amount and in response automatically trigger a shipment of one or more additional items. The disclosed monitoring system addresses deficiencies of traditional 'subscription orders' by ensuring stock is only replenished when it falls below a user-specified threshold, rather than at periodic intervals whether required or not.

17 Claims, 18 Drawing Sheets

(56) References Cited

U.S. PATENT DOCUMENTS

| | | |
|---|---|---|
| 8,484,049 B2 | 7/2013 | Mullenger et al. |
| 8,521,620 B2 | 8/2013 | Livingston et al. |
| 8,606,658 B2 | 12/2013 | Borom |
| 8,628,971 B2 | 1/2014 | Fritchie et al. |
| 8,712,585 B2 * | 4/2014 | Bruck ................. G07F 9/10 700/242 |
| 8,933,789 B1 * | 1/2015 | Fink ............. G06K 19/07758 340/10.1 |
| 2005/0190072 A1 | 9/2005 | Brown et al. |
| 2005/0253725 A1 | 11/2005 | Neuwirth et al. |
| 2007/0156536 A1 | 7/2007 | Alfandary et al. |

* cited by examiner

Shipment History      Home    Profile    Logout

| Date | Ship Qty | Status | Total Price |
|---|---|---|---|
| 2014-05-01 | 1 | In transit | $20.00 |
| 2014-04-22 | 1 | Delivered | $10.00 |
| 2014-04-25 | 2 | Delivered | $20.00 |

*Figure 12*

My Profile      Home    Profile    Logout

Creditcard information

Name: ☐

Number: ☐

Shipping/Billing Address

Street: ☐

City, Province: ☐

Zip/Postal Code: ☐

( Update )

AUTOMATIC AND SELF-MANAGING SUBSCRIPTION COMMERCE SYSTEM

CROSS REFERENCE TO RELATED APPLICATION

This application claims the benefit of U.S. Provisional Patent Application Ser. No. 62/029,440 filed on Jul. 26, 2014. This application also claims the benefit of U.S. Provisional Patent Application Ser. No. 62/110,487 filed on Jan. 31, 2015.

FIELD OF THE INVENTION

This invention generally relates to inventory management systems, and in particular to a monitoring system configured to automatically detect that an amount of a product in an environment has fallen below a threshold amount and in response automatically trigger a shipment of additional product.

BACKGROUND OF THE INVENTION

Specialized computing systems and communications protocols that enable the purchasing of goods are complex. In a given day, millions of electronic messages, signals and reports embodying goods to be displayed, inventory information, purchase orders, invoices, receipts, confirmations and the like are created, modified, transmitted, relayed, received, and otherwise processed amongst electronic commerce sites, customers, warehouses, manufacturers, fulfillment centers, couriers, logistics companies and other members and participants. Even businesses with physical storefronts (known as brick and mortar businesses in the art) typically use specialized computing systems and communications protocols to enable functions and processes such as keeping track of inventory, enabling sales, communicating with warehouses, etc. These complex, highly specialized systems and processes must be highly-reliable, accurate, rapid, efficient, and user-friendly in order to fulfill their intended functions. Despite the complexity of the highly specialized systems, there exists certain limitations.

For example, many products, such as groceries, personal care products, toiletries, even underwear and socks, are a recurring necessity as they either become worn after use or are consumed on a regular basis. To replace these items and replenish the stock, a customer needs to repeatedly purchase the products.

Each time the customer places a purchase, a new purchasing decision has to be made. Thus, it is to the advantage of both the customer and the vendor to reduce this trouble to a one-time inconvenience. The customer can then enjoy the product on a regular basis. Recently, there has been an emergence of services that allow customers to subscribe to tangible products, in which the products are delivered on a recurring basis. When consumers sign up for such services, there is no longer a need to go to the store, nor to spend time researching and hunting for items. The goal of the services is to make purchasing effortless. This convenience can be highly valued if the item is a recurring necessity and otherwise requires ongoing work by the customer.

The orders provided by the subscription service are known as subscription orders. They are also known by various other terms such as "recurring orders" and "standing orders". Collectively, the business model is known as subscription commerce. The business model entails purchase orders covering repeated deliveries of goods or services in specified quantities, at specified prices, and according to a specified schedule.

The subscription business model is not new. Many of us have subscribed to magazines or newspapers, whereby a physical copy is delivered by mail on a regular basis. Such periodicals often contained a postcard, which a subscriber can fill out to manage their subscription (i.e., to cancel or extend subscription). However, what has changed recently is the means by which customers can interact and control their subscription. Namely, the technologies that have enabled electronic commerce are allowing customers to manage their subscription through a convenient web interface.

Thus, many technology-based startups have recently pushed the subscription business into product spaces far beyond magazines, newspapers, or other such periodicals that are common for traditional subscription orders. Examples of tangible products that are available to be delivered on a schedule range from personal care products such as razor blades, shampoo, and body wash, to toiletries, to clothing such as underwear and socks, to makeup, to groceries and foods, to pet foods, just to name a few.

The spirit of a subscription model is a convenience provided by the automated shipments based on a schedule, without the need for customer intervention. The effort needed to subscribe to a product is paid off when the customer neither has to worry about running out of needed necessities nor spend time repeatedly purchasing items. Such a convenience comes at the risk of over-delivery, however. If products are shipped on a schedule, a new delivery may be made before the item is consumed, worn, or needed again, leading to the accumulation of items at the customer's hands.

To solve the problem of accumulation of shipments, recent advances in computing have enabled subscription commerce businesses to give customers control of their shipping by providing customers access to a personalized dashboard (i.e., a web interface). Using the dashboard, customers may at any time modify their subscription (i.e., changing product selection, shipping schedule, and quantity per shipment), rush shipments to receive products sooner, or delay shipments. Some services give customers the option of skipping a month or putting their subscription on pause. Many services also allow customers to cancel their subscription without penalty. Some services also allow the customer to return shipments that are not needed.

While such advances in user experience and software interfaces have enabled customers to easily manage their subscription, manual intervention is still often needed to control the subscription. In other words, while delivery is automated on a schedule, customer intervention is still needed to pause, modify, or cancel their subscription to prevent repeated shipments of yet unused items. There are several reasons why frequent manual intervention is problematic.

First, the current subscription model is not truly convenient because the one-time inconvenience to set up the subscription is compounded by the recurring and ongoing inconveniences in having to manage the subscription each time an item is not yet needed but still is shipped based on a schedule.

Second, since the burden is on the customer to delay a shipment, human error can occur whereby a customer may forget to log into their account and delay the shipment. In addition, the onus is also on the customer to rush a shipment should they need an item before the scheduled ship date. Again, the customer may forget to manually rush the order leading to a shortage of the needed item. The problem is, at least in part, that manual management of subscribed items needs to be done on a computer or other computing device (i.e., a smartphone). This likely leads to human errors because customers often are only mindful of the amount of items they have when they are either receiving a shipment or using the item. In either case, it may be neither feasible nor convenient to find a computing device to manage the subscription of the item at that point in time.

Third, if a customer has subscribed to many products, the customer is troubled with the need to keep track of which physical item corresponds to which subscription entry on their account dashboard. The customer would need to log into their account, search and identify the item from potentially a large list of subscribed products, and verify that they are indeed managing the right item. As the list of subscribed products grow longer, the convenience offered by the subscription model would be eroded.

Thus, it can be seen that there remains a need in the art to provide a subscription system that overcomes the aforementioned shortcomings. Namely, there remains a need to increase the convenience to customers, by greatly relieving the customer of the burden to manually manage shipping and delivery, and thus minimizing the requirement for ongoing human intervention and effort.

SUMMARY OF THE INVENTION

In accordance with an aspect, there is provided a monitoring system configured to automatically detect that an amount of items in an environment has fallen below a threshold amount and in response automatically trigger a shipment of one or more additional items.

According to illustrated embodiments of the present invention, the aforementioned and other drawbacks and difficulties of conventional subscription systems are addressed by providing a monitoring system that reduces the need for human intervention and management.

Instead of shipping items on a schedule, with no regard for whether a customer actually needs an item, embodiments of the monitoring system described herein allow customers to define how many items to maintain. The system, in one embodiment, then maintains that quantity by shipping only the required quantity of items to replenish customer's stock to desired level. In particular, as items are consumed, used, or discarded by the customer, the system detects changes in the stock level and automatically requests new shipments of the item to replenish the stock. Thus, according to embodiments described herein, the entire subscription paradigm is shifted: rather than customers choosing quantities of a product to be delivered, customers can choose to maintain the quantity of a product. The delivery criterion is not longer based on a schedule, but rather on the desired stock level of an item.

If customers are given the ability to choose the quantities of items they wish to maintain, and a system exists to faithfully and automatically carry out shipments to maintain the item's stock level, several problems are overcome. Namely, human intervention and effort is reduced, and correspondingly, the convenience of having recurring orders is increased. Human errors are also reduced, which reduces waste due to over-delivery. In addition, users would have a reduced need to find a corresponding item on a long subscription list in order to adjust delivery preferences.

In accordance with another aspect, there is provided a computing system comprising processing structure executing instructions for generating a user interface that permits configuration by a user of a threshold amount of at least one item to continually maintain in an environment.

In accordance with another aspect, there is provided a device comprising an RF tag operable to communicate with at least one RF reader; and a shield associated with the RF tag and manipulable with respect to the RF tag between a shielding position and an unshielding position, wherein while in the shielding position the shield blocks the RF tag from communicating with the one or more RF readers.

In accordance with another aspect, there is provided a device comprising an RF tag operable to communicate with at least one RF reader and configured to be associated with a container; and a disabling mechanism electrically associated with the RF tag and configured to be physically associated with a lid of the container, the disabling mechanism when physically associated with the lid of the container disabling the RF tag from communicating with the at least one RF reader in the event that the lid of the container is opened.

BRIEF DESCRIPTION OF THE DRAWINGS

Embodiments of the invention will now be described with reference to the appended drawings in which:

FIG. 12 depicts an example UI providing information about past deliveries and in transit shipments;

FIG. 13 depicts an example UI via which a customer can edit information associated with the customer;

DETAILED DESCRIPTION

Figure 1:
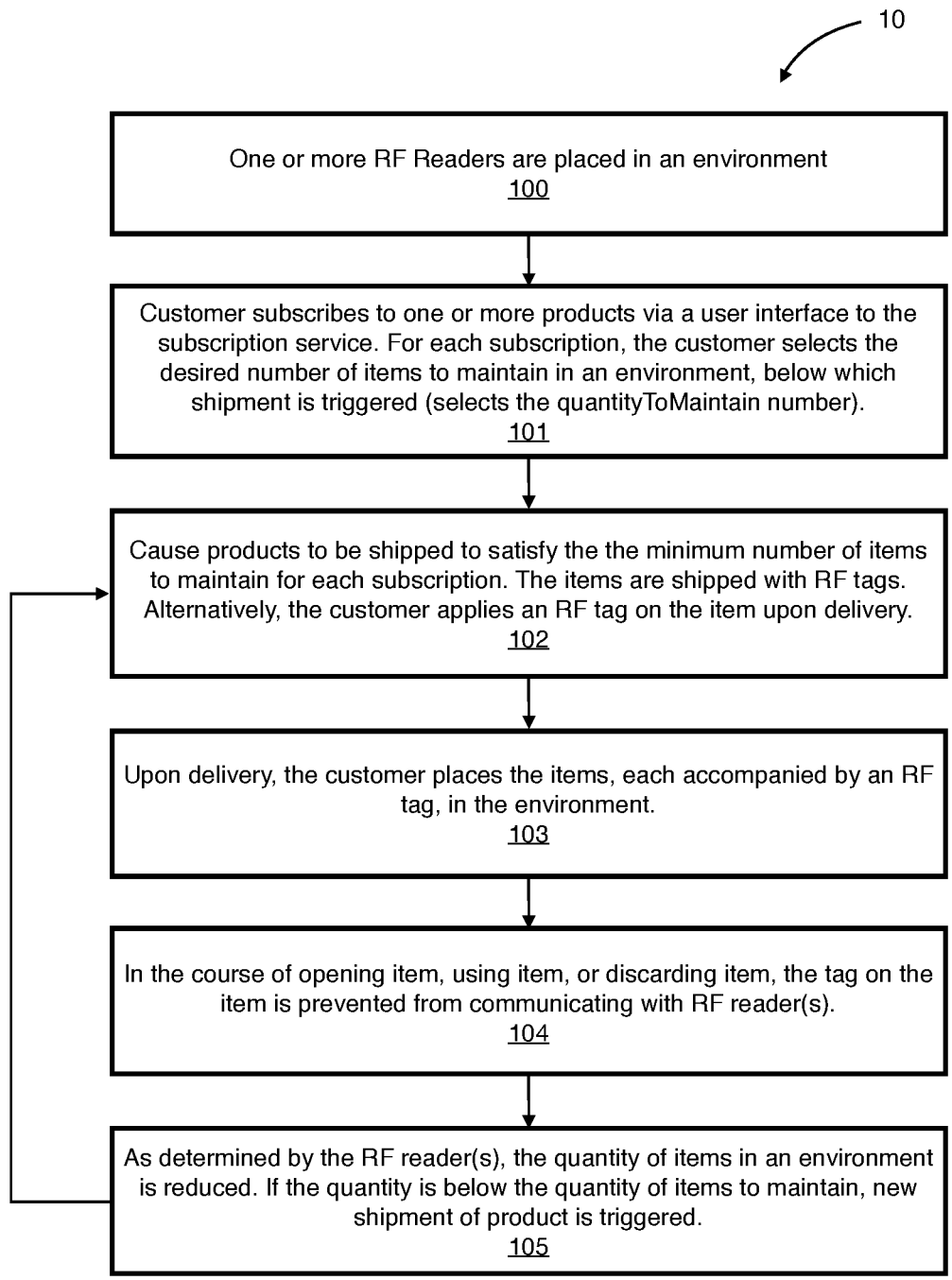
FIG. 1 depicts a high-level flowchart of basic steps in a process for implementing a monitoring system configured to automatically detect that an amount of items in an environment has fallen below a threshold amount and in response automatically trigger a shipment of one or more additional items.

Embodiments of a monitoring system configured to automatically detect that an amount of items in an environment has fallen below a threshold amount and in response automatically trigger a shipment of one or more additional items are described. In this regard, the following detailed description is merely illustrative in nature and is not intended to limit the invention or the application and uses of the invention. Furthermore, there is no intention to be bound by any express or implied theory presented in the preceding background, summary, or the following detailed description.

For simplicity and clarity, the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit component, e.g., radio-frequency (RF) devices, memory elements, digital signal processing elements, logic elements, look-up tables, or the like, which may carry out a variety of functions under the control of one or more microprocessors or other control devices. Additionally, elements in the figures are not necessarily drawn to scale. For example, the dimensions of some of the elements or regions in some of the figures may be exaggerated relative to other elements or regions of the same or other figures to help improve understanding of embodiments of the invention.

Furthermore, the connecting lines shown in the various figures contained herein are intended to represent example functional relationships and/or physical couplings between the various elements. Many alternative or additional functional relationships or physical connections may be present in a practical embodiment.

For the sake of brevity and to avoid obscuring aspects of the invention, conventional techniques related to signal processing, data transmission, signaling, network control, the 802.11 family of specifications, wireless networks, Radio Frequency Identification (RFID) systems and specifications, Bluetooth systems and specifications, and other functional aspects of the system (and the individual operating components of the system) may not be described in detail herein. In addition, those skilled in the art will appreciate that the present invention may be practiced in conjunction with any number of data transmission protocols and that the system described herein is merely one example application of the invention.

As used throughout this application, the word "may" is used in a permissive sense (i.e., meaning having the potential to), rather than the mandatory sense (i.e., meaning must). Similarly, the words "comprising", "include", "including", and "includes" mean including, but not limited to.

The terms "users" and "customers" are used interchangeably herein, since the users of the monitoring system are also customers of the enterprise providing the monitoring system. A user may be an individual or a group of individuals (such as an organization) that has an account with the monitoring system. Similarly, the terms "user account" and "customer account" are used interchangeably herein. In addition, the terms "monitoring system", "subscription system", "subscription service", and "subscription commerce" are used interchangeably herein. In addition, the terms "communicate", "identify", "detect", "interrogate", "read", and "scan" are also used interchangeably herein.

Herein, the term "product" is used to refer to a class or type of identical objects as a whole, while the term "item" is used to denote a particular instance of a "product". For example, the soft drinks Coke and Pepsi denote two products, while the individual cans or bottles of Coke or Pepsi are referred to as items. As described in more detail below for FIG. 2B, an "item" may also be a container containing one or more objects or otherwise a group of objects even if not contained.

Figure 3:
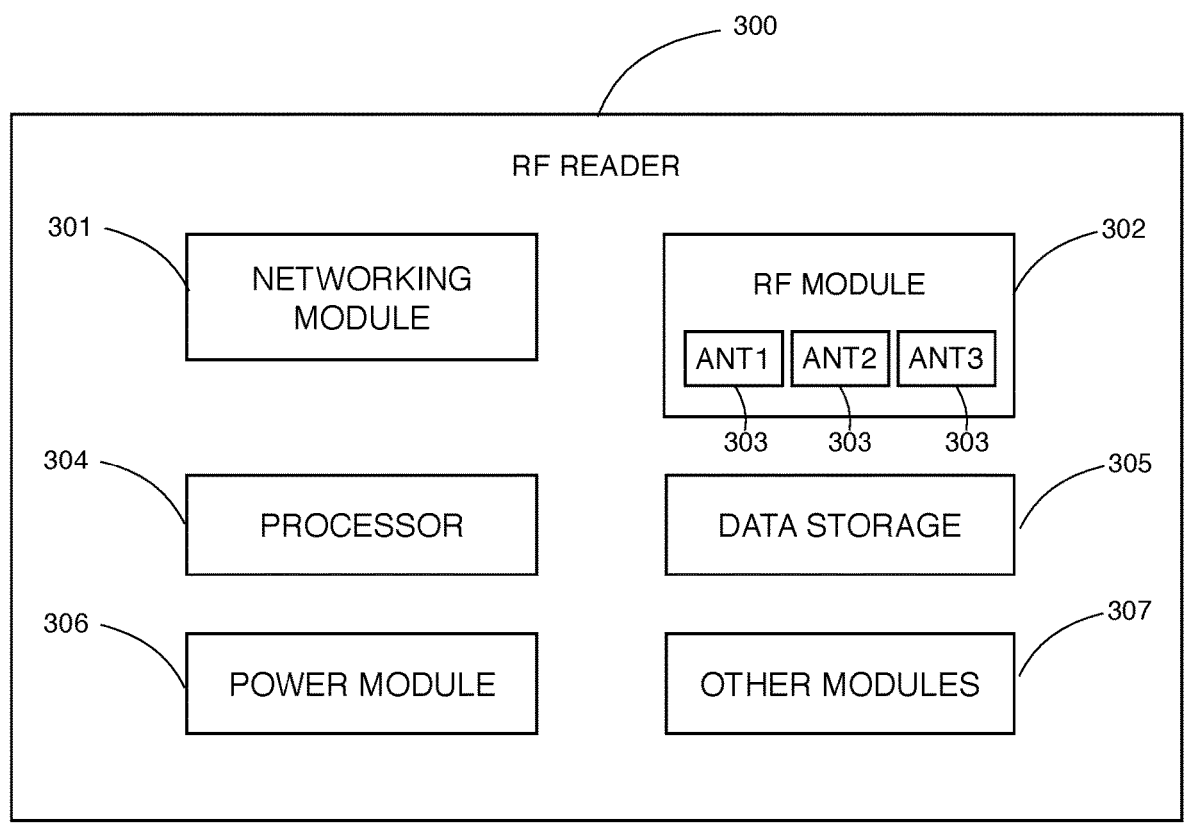
FIG. 3 depicts a simplified block diagram of an RF reader.

FIG. 1 is a high-level flowchart of a method 10 for implementing an intelligent subscription service according to at least some embodiments. As indicated at 100, one or more RF reader devices (or simply "readers") such as the reader 300 of FIG. 3 is placed within an environment. The environment may be a controlled area, customer's home, an office area, a retail store, a warehouse, a clinic, a laboratory, or another controlled or confined area. The environment can be composed of several controlled or confined areas. For example, two laboratory rooms belonging to the same scientist. In addition, the areas need not be contiguous and two controlled or confined areas may be separated by an area not part of the environment belonging to the user. For example, two laboratory rooms belonging to the same scientist may be located on different floors, or be separated by a third room belonging to a different user, etc.

The environment is herein also known as "site" or "customer's site". The reader 300 may be placed on the environment by a customer, an employee of the enterprise providing the subscription system, or any other persons and using any other means. For example, an employee of an enterprise may do a site survey and place or install the reader on behalf of the customer. In another example, a customer may purchase the reader 300 from a store or receive the reader 300 by mail and it is the customer who installs or places the reader 300 in their environment. In another example, the customer may install a software application on a mobile or wearable device, or any other consumer device. Such consumer devices may be smartphones, smart glasses, smart watches, TV set top boxes, gaming consoles, or any other consumer electronic device with RF reading capabilities. The software enables the device to become an RF reader 300 suitable for use with a subscription system. In another example, the reader 300 capabilities may be built into a consumer device, which the customer can use with the monitoring system.

Figure 4:
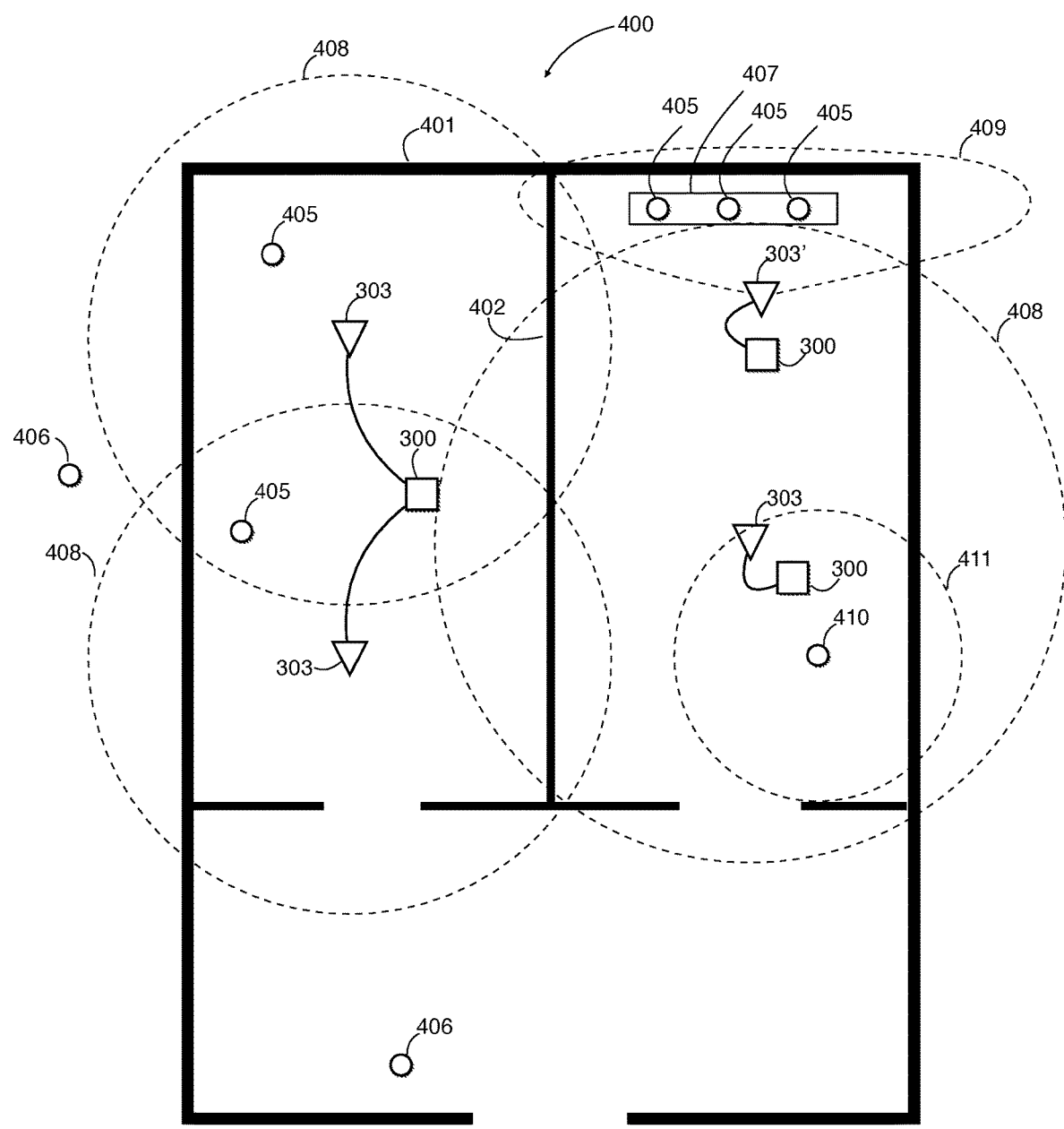
FIG. 4 depicts an example of a schematic view of an environment, along with illustrative placements of RF readers, antennas, and tags, as well as associated communication ranges between the RF readers and tags.
Figure 14:
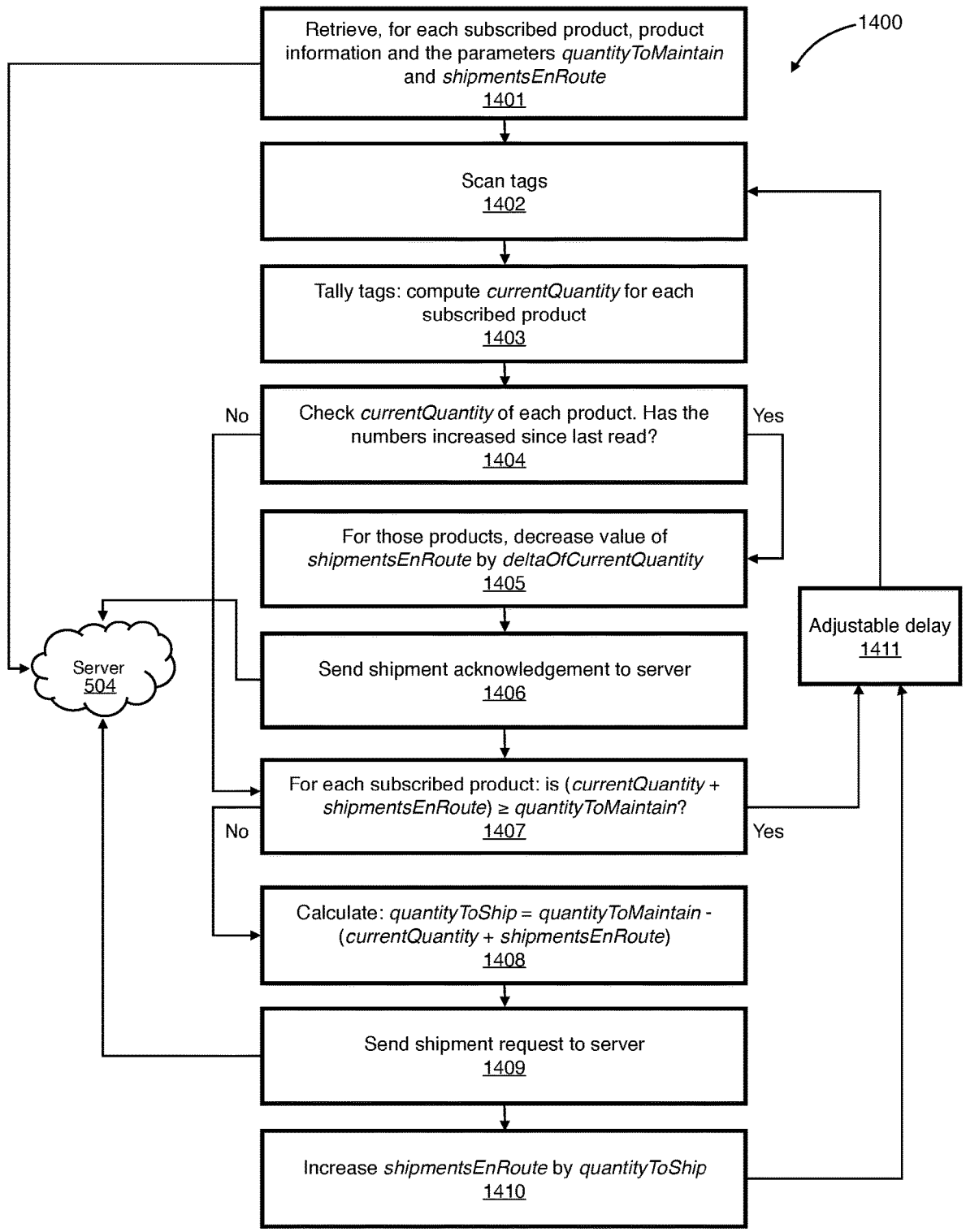
FIG. 14 depicts an example process compatible with tags that are unique to the product at the logic level of the system.
Figure 16:
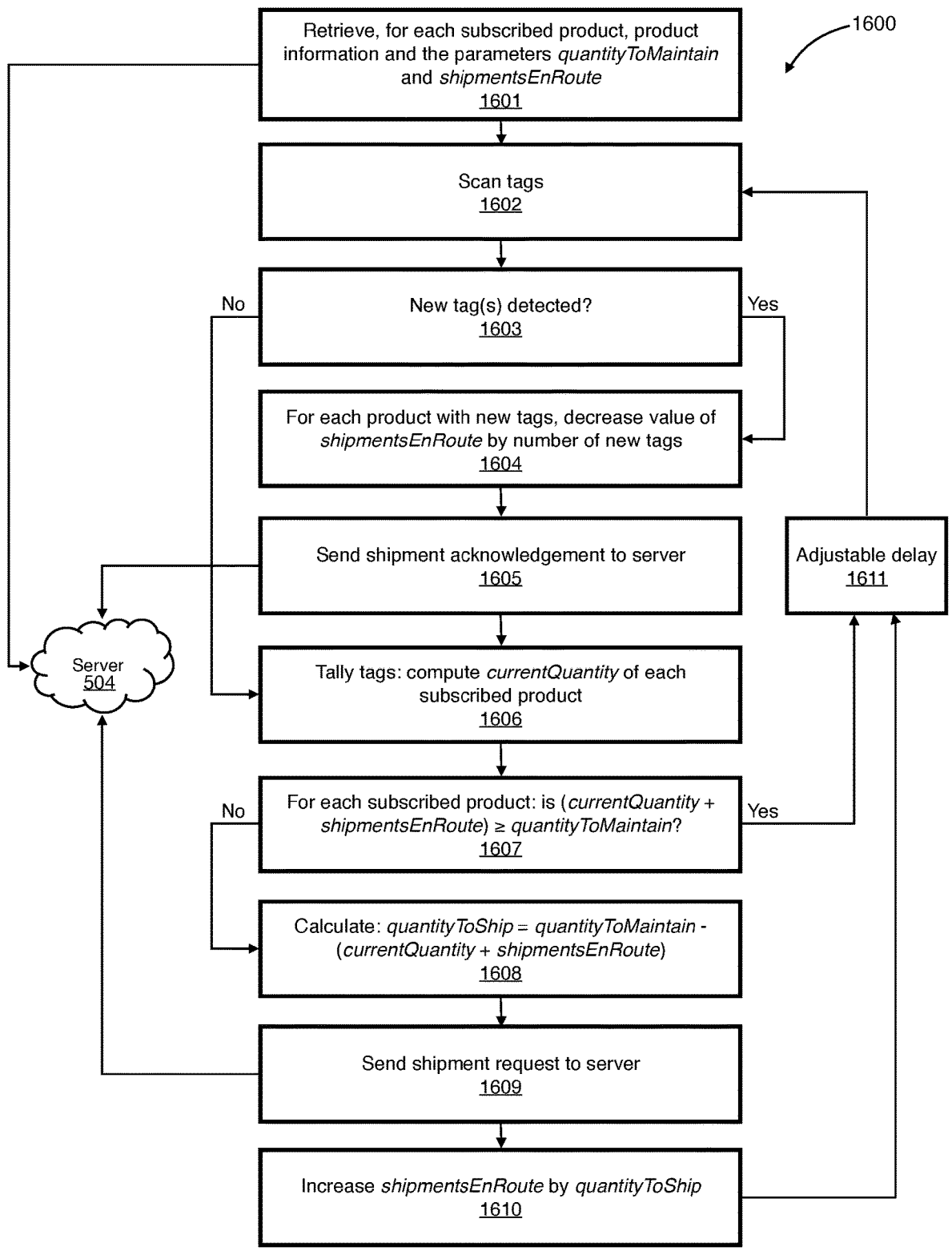
FIG. 16 depicts an example process compatible with tags that are unique to the instance at the logic level of the system.

The reader 300 may be stationary or mobile (e.g., mobility as afforded by a handheld or wearable device). An example of the reader 300 is illustrated in FIG. 3, and examples of the procedures performed by the reader are illustrated in FIGS. 14 and 16. A stationary reader may be fixed at a certain location in the environment or may be placed at a location without being expressly fastened securely. In general, a stationary reader is not designed to be moved around the environment and its location, being constant, can be known by the subscription system. An example of placements of RF readers 300 within an environment is illustrated in FIG. 4. In contrast, a mobile reader 300 is designed to be moved around the environment. Fewer mobile readers 300 than stationary readers 300 may be needed to cover an environment, which can be advantageous. A mobile reader 300 can roam the environment, which can potentially cover areas of multiple stationary readers.

In at least some embodiments, customers may be required to already have, or to set up if they do not already have, a customer account with the subscription system. In another embodiment, as described in more detail below, if the customer does not already have an existing customer account, the customer may browse products and select quantities of items to maintain. However, upon subscribing, the customer will be asked to create a customer account. Once the customer account is created, one or more readers 300 are then associated with a customer account. For example, in an embodiment, each reader 300 can have a unique identifier (or simply "readerID") that may be reflected in a data store (e.g., stored in a look-up table of the data store 505 of FIG. 5). To associate a reader 300 with a customer account, the readerID may be associated in a correlation table with the user ID of the customer account (e.g., UserID field of TagsTable 1505 of FIG. 15). In some embodiments, the reader 300 may cache a local copy of the associated UserID to reduce server load and increase the efficiency of the subscription system.

Figure 5:
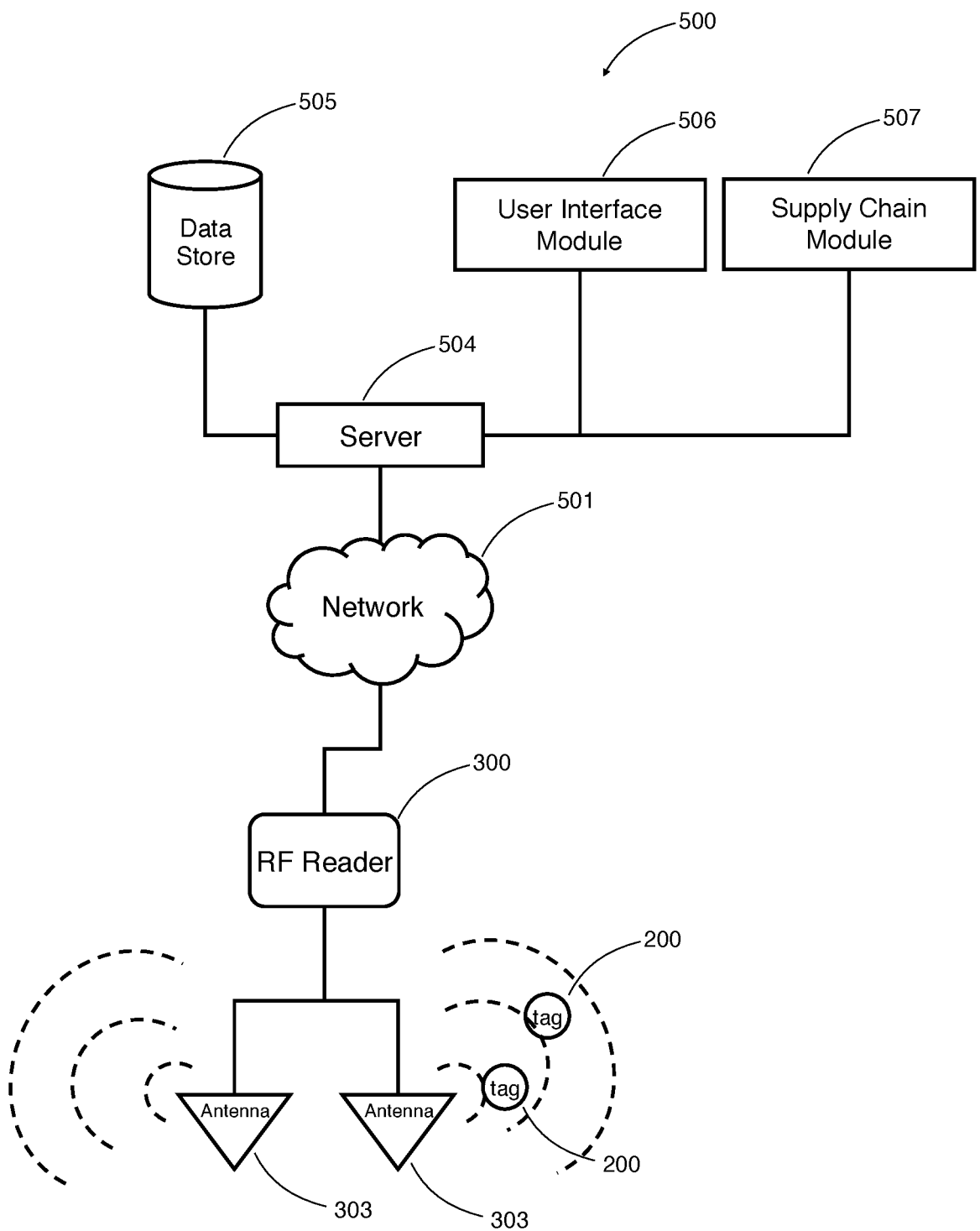
FIG. 5 depicts an example of a system architecture of the monitoring system.

In some embodiments, the reader 300 sends authentication information along with any communication with the subscription system (e.g., to the server 504 of FIG. 5). For example, a readerID and password combination can be exchanged with the server 504 of FIG. 5 for an access token. The reader 300 then sends the access token along with any request it makes. In another example, the reader may simply store the readerID and password combination and send it along with each communication to a server. In yet another example, a unique Application Programming Interface (API) key may be assigned to a reader and the reader sends the API key along with each request. Such authentication and authorization methods are well known in the art and many proprietary and open source solutions are available (e.g., oauth). For the sake of brevity, readerID/password or username/password combinations, access tokens, API keys, and the like will henceforth be known as "authentication information". Authenticating the reader 300 may prevent or reduce the possibilities of an attacker spoofing the reader 300 and sending the subscription system spoofed messages, and thereby causing the system to malfunction.

In at least some embodiments, the system may store customer account information and associated authentication information on one or more servers 504 and/or data stores 505. This information can then be retrieved by the system to verify and ensure that communications are authorized and authenticated.

In at least some embodiments, authentication information is acquired by the reader 300 during initial setup. For example, the reader 300 may provide an interface (e.g., on a built in display, or via other means) to allow a customer to enter authentication information. In another example, authentication information may be written to a file and placed on a storage device such as a USB flash drive, magnetic drive, optical media, and the like. The reader 300 may be configured to mount the storage device and to search for a file and read the authentication information contained within. In another example, authentication information may be hard coded into the reader 300. In at least some embodiments, the authentication information may be stored securely on the reader 300, such as via encryption. The examples provided are intended to teach with clarity how a reader 300 may come to possess authentication information and are not intended to be limiting.

As indicated at 101, the system provides the customer a user interface (UI) via which the customer is able to browse and subscribe to one or more products. In some embodiments, the interface available to the customer may depend on their login status. Some or all of the interfaces, or aspects of the interfaces, may be available only to users who are logged in. For example, one embodiment may require a user to log in before any of the interface (except for the login UI) is made available to the user. Another example embodiment may allow the user to browse products, but not see the prices, if the user is not logged in. Another example embodiment may allow the user to see both products and the prices if the user is not logged in. In at least some embodiments, the user is required to log in before subscribing to one or more products. FIGS. 6 through 13 illustrate examples of various graphical user interface (GUI) screens and UI elements that may be provided to customers in at least some embodiments and that allow customers to subscribe and manage their subscriptions. As described below, the UI need not be graphical. The UI may be a spoken audio interface, a gestures interface, a motion interface, or combinations thereof.

In some embodiments, the interface may be provided by the User Interface module 506 of FIG. 5. In one embodiment, the module 506 comprises a processing structure that executes instructions for generating and/or operating a user interface that permits configuration by a user of the threshold amount. For example, the user interface may be made available over a network and is accessed via a network-enabled client device. For example, the UI may be a web page that is accessible with a client device over a network. In one embodiment, a set of APIs is provided which a client device can use to provide UI to the user. For example, a native application residing on a client device, one that is coded for a specific hardware platform, may connect to the APIs. The UI is then enabled by a combination of native client code and communication with the APIs. In one embodiment, the user interface may be built into the reader 300. For example, a user may interact with the UI directly on the reader, perhaps through a built-in display and user input modules, microphones, speakers, or motion capture modules, etc.

Figure 8:
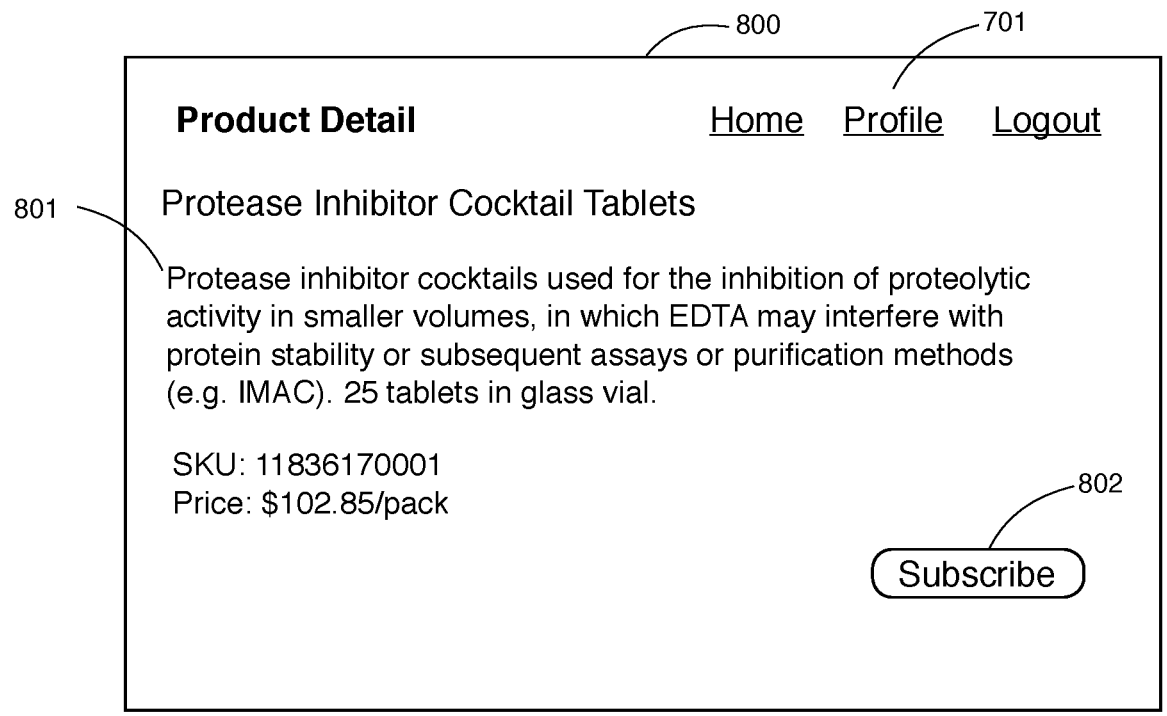
FIG. 8 depicts an example UI providing details about a particular product.
Figure 9:
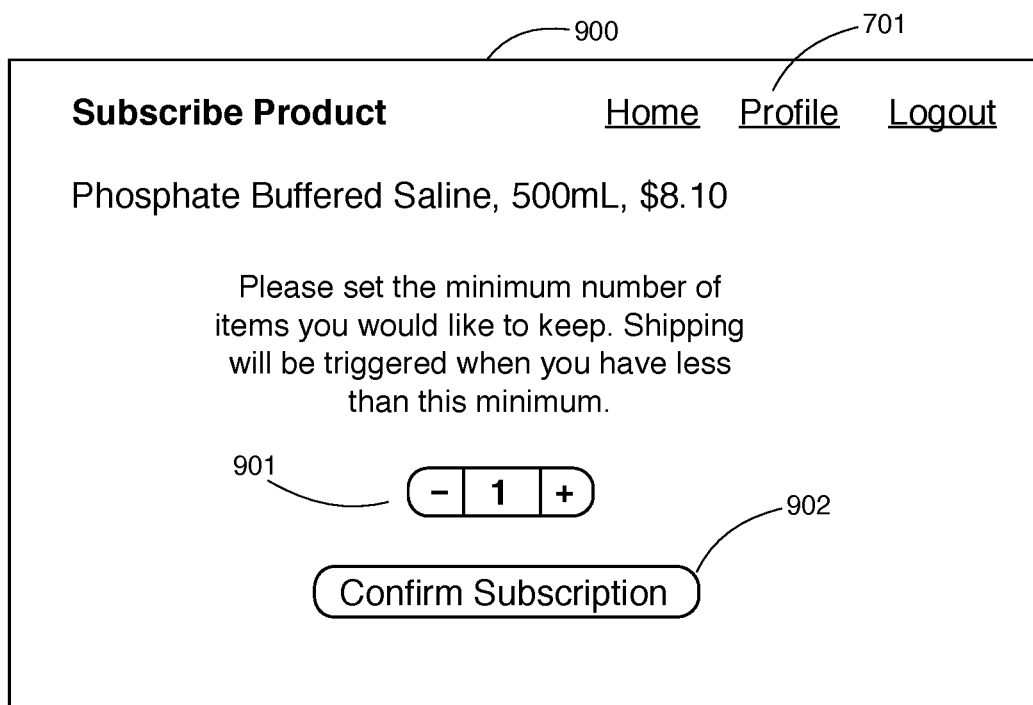
FIG. 9 depicts an example UI via which a customer can subscribe to a product.

To subscribe to a product, which is to establish a subscription to a product that maintains a desired level of the product in an environment, the customer selects the quantity of items to maintain at the environment. FIGS. 8 and 9 provide an example of a GUI that permits a user to configure subscriptions to products. Once the customer has subscribed to one or more products, the system causes initial quantity to be shipped to reach the desired quantity at the environment.

Figures 2A, 2B:
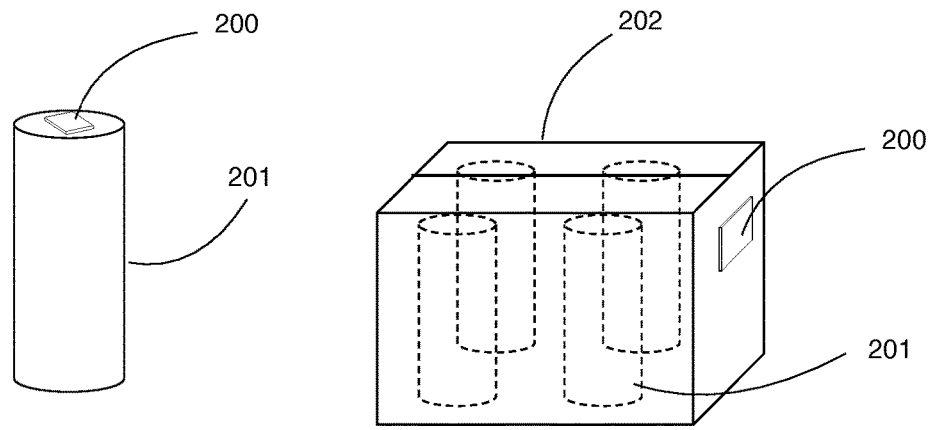
FIG. 2A depicts an example of an item that is affixed with a tag.
FIG. 2B depicts an example of a container that is affixed with a tag, the container carrying several objects of the same product type.

With items of the subscribed products having been shipped to the environment, as indicated at 102, the system uses RF tags (or simply "tags"), e.g. tags 200 of FIG. 2A, affixed to items to determine the quantity of items in an environment. As described below, a tag 200 may contain complete information on the associated item, or it may simply contain an ID, which the system can use as a handle on a look-up table to find information regarding the item on which the tag 200 is affixed. In one embodiment, items are affixed with a tag 200 prior to shipment, such as at the warehouse. In this case, a customer or another person could simply place the tagged items in the environment and the system will recognize the tags. In another embodiment, the products may be shipped without a tag 200. In this case, upon delivery to the user, the user will place a tag on the item. Tags may be obtained from the enterprise providing the subscription system or elsewhere. Details about tags and their placements on items are illustrated in FIGS. 2A and 2B.

As indicated at 103, the items and the associated RF tags 200 are then placed in the environment, which would allow communication with one or more readers 300. As described below, the environment can be larger than the maximum communication distance between a particular tag 200 and a particular reader 300. The readers 300 detect the tags 200 present in the environment to determine the quantity of items in the environment. Two embodiments of processes carried out by the system to determine the quantity of items are illustrated in FIGS. 14 and 16.

As indicated at 104, and as will be described in more detail below, when an item is opened, used, or discarded, the tag 200 on the item is prevented from communicating with the reader 300, which would decrease the apparent quantity in the environment. The reader 300, unable to communicate with the tag 200, registers an apparent quantity decrease for the tag 200 it had previously been communicating with. Examples of the methods of preventing reader-tag communication that are unobtrusive and natural are illustrated in FIGS. 18 through 23. In these examples, reader-tag communication is prevented during the course of opening, using, or discarding the items (e.g., by discarding and moving product out of the environment, moving product into a shielded compartment, destroying the tag on the product, turning the tag off, etc.).

As will be described in more detail below (FIGS. 14-17), if the quantity of items of a particular subscribed product is below the quantity to be maintained in an environment, then a new round of shipment is triggered 105.

FIG. 2A illustrates an example of an item that is tagged with an RF tag 200. The tag 200 (sometimes referred to as a "transponder" or a "beacon") can be of various types. We do not intend to limit the embodiment to any particular type of tag, RF technology, or communication protocol. Furthermore, one embodiment of the subscription system may use tags of different types within the same environment. The tag 200 refers, in general, to any RF element that can be communicated with, be interrogated, or be passively detected and contains information that can be read by another component. It should be understood that the communication need not be limited to the radio-frequency range and may operate in any suitable range of frequencies, as one skilled in the art will recognize. By way of example and not by way of limitation, such tags may be RFID tags, Bluetooth beacons (including Bluetooth Low Energy beacons), ZigBee devices (and other variants of the IEEE 802.15 protocol), IEEE 802.11 (any variation), magnetic induction, or the like. The reader 300 would similarly be configured with the technologies matching the tag 200. In general, tags 200 may be classified as active, passive, or semi-active. Active tags are devices that incorporate some form of power source (e.g., batteries, capacitors, or the like) and are typically always "on," while passive tags are tags that are exclusively energized via an RF energy source received from a nearby antenna. Semi-active tags are tags with their own power source, but which are in a standby or inactive mode until they receive a signal from an external RF reader, whereupon they "wake up" and operate for a time just as though they were active tags. Certain technologies such as RFID are commercially available as both active and passive tags, while other technologies such as Bluetooth Low Energy typically are only commercially available as active tags. The aforementioned tags and technologies are well known in the art, and need not be described in detail herein. Since "active" and "semi-active" tags both incorporate a power source, the two terms are used interchangeably herein.

Depending on the amount of power available to a tag 200, the tag 200 may be able to carry out processing beyond sending and receiving RF signals, by incorporating more developed processing structure, thereby enabling the tag 200 to respond to and make use of sensors, buttons, or other peripherals. For example, a tag 200 may contain a physical button or switch, and the processing structure of the tag 200 may be configured to respond to the button or switch, which would allow the tag to be turned on or off by pressing the button or switch. Typically, the power source incorporated by an active tag can be much more substantial than the energy received by a passive tag. Thus, active tags are well suited to be configured for the extra peripherals and functionality.

The tag 200 may be written with payload information about an associated item and may contain specific item information such as an item's product class, serial number, lot number, manufacturing date, expiration date, and so forth. The tag 200 may also be written with a unique identifier. In addition, the enterprise of the subscription service provider may also encode information such as the enterprise name into the tag 200. In addition, information identifying a user may also be written into the tag 200 (e.g., UserID of UsersTable 1501 of FIG. 15). Any other information, related or unrelated to a subscription service, may also be written into the tag 200.

The item 201 represents any physical object that can be delivered to the customer. As described above, herein the term "product" denotes any group, type, class, or category of items 201 that share the same or similar features. Typically, products are assigned identifiers such as the Stock Keeping Unit (SKU). Items 201 of the same product share the same SKU.

The item 201 may be of various shapes and sizes. Examples of items include but are not limited to the following: shampoo bottle, cereal box, a bar of soap, pack of printing paper, pack of coffee pods, etc. One skilled in the art can appreciate that many items are needed repeatedly and thus can be provided as a subscription. For example, a laboratory at an academic institution, hospital, or pharmaceutical company would need to repeatedly order disposable or consumable items such as tubes, tissue culture plates, syringes and chemical reagents. A manufacturing factory may need to order raw materials or parts on a recurring basis. A brick and mortar store would also need to repeatedly purchase products from a supplier to keep their shelves from being depleted. An office in the financial district may need to repeatedly order stationery such as paper, as well as food items such as coffee, on a regular basis. All of these scenarios can benefit from a subscription system described herein.

The placement of the tag 200 may be anywhere on or in the item 201. For example, the tag 200 may be applied on the outside surface or inside surface of the item 201 (e.g., sticking the tag on the outside or inside of box or bottle). In addition, the tag 200 may be built into the surface of the item 201 (e.g., the conductive coils, antenna, or circuitry of an RF tag may be embedded in the wall of a container). Furthermore, the tag 200 may be placed within the item 201 (e.g., a tag may be placed in the middle of a bar of soap). The aforementioned examples are not meant to be exhaustive and are merely intended to illustrate the various possible placements of tags 200 with the item 201.

In one embodiment, the tags 200 are unique to the product at the logic level of the system. It follows that one or more tags 200 present in the same environment may contain identical payload information. For example, tags 200 associated with items 201 of the same product class may be assigned the same ID. This ID may be the SKU given to the product, or some unique identifier associated with each product that is used internally by the system (e.g., ProductID field of ProductsTable 1504 of FIG. 15), or any other chains of letters, numbers, and/or symbols. Thus to the logic level of the subscription system, it would encounter one or more tags 200 bearing the same payload because the tags 200 are associated with items of the same product. Although the tags are not uniquely identified to the logic level of the system, the system will be able to know what product an item belongs to by reading the tag to extract the ID associated with the product. An advantage of having tags 200 unique to the product (and thus share the same payload if they are of the same product) may be the reduced complexity required of the subscription system, and the reduced management necessary of tag writing devices.

At the underlying hardware level, the tags 200 may be uniquely identifiable and the system would be able to distinguish between two tags and determine that two distinct tags are being read, even if at the logic level, the payload of the two tags are the same. For example, this may be implemented by unique identifiers being encoded into tags as they are manufactured and which the unique identifiers are only accessible to the hardware level of the system. In an embodiment, the hardware level of the system may not be aware and may not understand which product a tag belongs to, but simply confirms that two different tags 200 are being read, and presents the payload to the logic level of the subscription system for interpretation. The hardware may also be able to distinguish between two tags bearing identical information by other means such as receiving signals at different time points. For example, if the hardware sends an interrogation signal and receives responses from tags at different times, it may be able to distinguish between identical tags.

As described previously, items may be affixed with a tag 200 prior to shipment, or the items are shipped without tags and the customer affixes the tag. In the embodiment where tags are affixed to items prior to shipment, tags would have been configured to store the aforementioned payload information prior to shipment (e.g., ProductID, UserID and the like and combinations thereof). The payload information may be written to the tag at the time of manufacture, or the tags are written to by the enterprise providing the subscription service or a third party. Devices used to write to tags 200 are well known in the art and need not be described in further detail herein. In the embodiment where items are shipped without tags, the customer may separately acquire pre-written tags already with payload information. The customer would select the tag with the payload information matching the product class an item belongs to, and affix the tag to the item. Alternatively, the customer may themselves write payload information into a tag and affix the tag to the item.

In another embodiment, the tag 200 is unique to the instance at the logic level of the system. Each tag 200 affixed to an item would have a different payload and are thus uniquely identified. It follows that each tag 200 present in an environment contains a different payload, regardless of whether the tags 200 represent the same product. For example, the unique identifier (or simply "ID") can be a unique number assigned to tags 200. This may be accomplished by increasing a number in sequence as the tags 200 are manufactured, or be an internal number assigned to tags 200 in sequence as the tags 200 are written to by the enterprise providing the subscription service or a third party. In another example, the ID may be a universally unique identifier (UUID), as standardized by the Open Software Foundation (OSF). One skilled in the art can easily recognize that there are many other ways of generating unique identifiers. The ID can also be a composite of two or more pieces of information, which may not be unique individually, but when combined can uniquely identify a tag 200. Thus, the ID can be any piece (or pieces) of information as long as no two tags present in the same environment share the same piece (or pieces) of identifying information. As mentioned later regarding table 1705 of FIG. 17, the unique ID of the tag 200 also allows the system to create an entry for the tag 200 in a database, enabling the system to store tag-related information externally of the tag 200. An example of an advantage of having tags 200 unique to the instance (and thus are uniquely identified) is that it allows the logic level to determine whether two detections of tags 200 at distant time points are actually the same tag. Other advantages will become apparent with a careful perusal of the detailed description accompanying FIG. 17.

In the embodiment where tags 200 are affixed to items prior to shipment, tags would have been configured to at least store the unique ID prior to shipment. In addition, the tag may store the ProductID, UserID and other information and combinations thereof. If tag-related information is to be stored externally in the data store 505, then a database entry for the tag 200 is created by the enterprise providing the subscription service or a third party prior to the shipping of the items, and the database entry initialized with information relevant to the tag, such as the ProductID, UserID and the like and combinations thereof.

In the embodiment where items are shipped without tags, the customer may separately acquire pre-written tags 200 already written with unique IDs. Alternatively, the customer may themselves write unique IDs into a tag using a writer device. Using a UI (not shown) on a specialized tag writer or on a computing device, the customer would then associate the uniquely identified tag with a particular product. In this process, the ProductID could either be written and added to the tag and/or the ProductID added to the database entry associated with the tag. When the tag is ready, the customer would affix the tag to the item. One skilled in the art can easily recognize that the aforementioned steps may be in a different order and/or combined, and still produce the desired outcome. For example, in some embodiments, the user may first select which product the item belongs to, and then a writer device simultaneously writes into a tag both a unique ID and the ProductID.

FIG. 2B illustrates an example of the term "item" denoting an object being a container or a grouping of objects not otherwise contained within a structure. For example, several objects 201 of the same type are enclosed within a container 202. The tag 200 is then applied on the container 202 as a whole rather than on the individual objects contained within. Such an arrangement may be advantageous if the customer needs objects that are small and/or numerous. For example, if an object is small, there may not be enough space on the object itself to place a tag 200, and thus the small object can be enclosed by a larger container and the tag 200 is applied to the container 202 instead. Also, placing tags on the container minimizes the number of tags needed, which may be advantageous since each tag carries a monetary cost. For example, if a tag is placed on a container carrying 20 objects, then only one tag is needed. Conversely, if a tag were to be placed on each of the 20 objects, then 20 tags would be needed. In addition, tagging a container may allow the container (and its associated tag) to be reused and/or recycled, while still freeing the user to discard and dispose of the objects contained within. For example, if the container contains objects that are bottles of toxic reagents for a laboratory, a researcher may wish to dispose of used bottles accordingly while an enterprise offering the subscription service can still reuse or recycle the container and its associated tag. One skilled in the art can realize that although the term "container" is used herein, a group of objects even if not contained may be fastened together and still be affixed a tag 200. Thus, we do not intend to limit the terms "item" or "container" to groupings of objects that must expressly be enclosed within a structure.

FIG. 3 is a simplified block diagram of an RF reader 300 included in the subscription system, in accordance with an example embodiment. The functionality of the reader 300 is explained with respect to various modules depicted in the block diagram. It is to be understood that the various modules are shown to facilitate better understanding of the reader 300. However, the modules included in the reader are not meant to be a limitation on an embodiment of the present disclosure. It will be apparent to those of ordinary skill in the art that other alternative equivalents and/or arrangements of various modules and system architectures may also be used.

As described previously, the reader 300 may be a fixed device or a portable device. In case the readers are portable devices, the readers can be moved around the environment to read tags from different locations.

In one embodiment, the reader 300 includes a networking module 301, an RF module 302, one or more antennas 303 associated with the RF module 302, processing structure 304, data storage system 305, a power module 306, and other modules 307 that may assist in the proper functioning of the reader 300.

The networking module 301 enables the reader 300 to send and receive instructions to and from a server (e.g., server 504 of FIG. 5), to communicate with other readers 300, or any other computer or device. The server 504 may be located off-site or on-site. The networking module 301 may use any number and combinations of technologies and communication protocols including Ethernet (IEEE 802.3), token ring, Wi-Fi (IEEE 802.11; any variation), WiMax (IEEE 802.16), ZigBee (IEEE 802.15), cellular/wireless/cordless telecommunication protocols, wireless home network communication protocols, paging network protocols, magnetic induction, IrDA infrared protocols, satellite data communication protocols, wireless hospital or health care facility network protocols such as those operating in the WMTS bands, GPRS, wireless USB, fiber optic interfaces, or any other public or proprietary networking protocol. These interfaces are well known to persons skilled in the relevant arts.

The RF module 302 enables the device to identify and/or interrogate one or more tags (e.g., the tags 200 of FIG. 2). We do not intend to limit the embodiment of the RF module 302 to read any particular type of tag, RF technology, or communication protocol, or combinations thereof. The RF module 302 may also incorporate additional functionality, such as filtering, cyclic-redundancy checks (CRC), and tag writing, as is known in the art. In addition, the RF module 302 can be configured to scan tags substantially continuously, at an interval, or in response to an input (e.g., from a user or a server).

The RF module 302 includes one or more antennas 303 for transmitting and receiving RF signals. In one embodiment, the antennas 303 can be a dual-polarized antenna, a circularly polarized antenna, or an omni-directional antenna. The RF module 302 can have multiple antennas to create different radiation patterns and polarizations by switching between the antennas. In an embodiment, the antennas can have at least two orthogonal polarizations for each antenna pattern. Although three antennas 303 are illustrated in FIG. 3, it should be understood that the RF module 302 can include more or fewer than the number of antennas 303 shown. A multiplexer may allow for multiple antennas to be connected to one RF module 302. Additional multiplexers may be used and each may be connected to additional RF antennas. Alternatively, the use of multiplexers may be omitted. In some embodiments, the RF antenna 303 would transmit interrogator signals to passive or semi-active tags. In this case, the antenna would have a read range, beyond which the antenna would be unable to communicate with the tags. In another embodiment, the reader 300 may be passive in which it only receives radio signals from active tags. For example, if the active tag is a Bluetooth Low Energy beacon, the tag would broadcast RF signals (known as advertising packets in the art) that an RF antenna 303 could receive. In this case, the active tag has a broadcast range beyond which the antenna 303 would be unable to receive the signal. Regardless of whether the tag is active or passive, the ability of the reader to communicate with the tag depends on the distance between the tag 200 and the antenna 303 of the reader 300.

In addition, one skilled in the art can understand that some or all of the antennas 303 may be located within the housing of the reader 300, may be located outside of the housing of the reader 300, or a combination thereof.

The processor block 304 denotes a system of one or more processors and associated memory (e.g., caches) and other circuitry, configured specifically with processor-readable code that may be stored in the data storage system 305 and when executed by the one or more processors enables the reader 300 to perform the various method embodiments described herein. For example, the processing system 304 may receive initial or adjusted parameters from a server such as server 504 of FIG. 5 or other networked readers 300 using the networking module 301, and may store the processing parameters in the data storage system 305, and may carry out the processes as illustrated in FIGS. 14 and 16. In addition, the processing system 304 may create and maintain a current inventory database (e.g., in data storage system 305 or elsewhere such as server 504) based on tag 200 identifying information received from tags within the reading range of the RF module 302.

The data storage module 305 may, without loss of generality, comprise a random access memory or other volatile storage device, comprise a read only memory (ROM) and/or static storage device for storing static information and instructions for the one or more processors, and comprise a data storage device such as a magnetic disk, electronic disk (e.g., solid-state drive or flash drive), or optical disk and its corresponding disk drive.

The power module 306 provides operating power to the RF reader 300. In the first embodiment, the reader 300 is AC-powered, obtaining power from AC main supply. The power module thus converts AC power into the form suitable for use by the reader 300. In the second embodiment, the reader 300 is battery powered. The power module 306 includes a battery that supplies power to the reader 300. The battery can be trickle charged from ambient lighting at the environment. In the third embodiment, the reader 300 may be both AC-powered and battery powered, depending on the availability of each. In one embodiment, the reader 300 is operative at low duty cycle and usually in OFF mode, and only turns ON for a short period of time, to extend battery life.

Other modules 307 may include a USB module, a display module, and/or a button module. The USB module can allow receiving instructions and parameters from a USB connected device (e.g., a computer). The USB module may also accept a USB drive, such as a flash drive; for example, one or more files containing instructions and/or parameters for the RF reader 300 can be placed on a USB flash drive, and upon connecting the flash drive to the USB module, the one or more files are read to carry out the instructions and/or parameters contained within the files. The display module may contain a display device, associated circuits and microchips, and drivers. The display device can project a user interface to the user and may be a liquid crystal display (LCD), cathode ray tube (CRT), or the like. The display may also respond to touch, to provide a touch screen interface for controlling the reader 300. The button module would include physical buttons and/or dials to control the reader 300, to change its instructions and operation modes.

Some or all modules of the reader 300, and the combinations of the modules, may be commercially available. For example, modern mobile devices, such as smartphones, smart glasses, smart watches, and the like, may include most, if not all, of the modules illustrated in FIG. 3.

FIG. 4 is an example of some of the possible placements of readers, antennas, and items in an environment, in accordance with one embodiment of the present invention. A schematic view of an environment 400 (e.g., customer's home, an office area, a retail store, a warehouse, a clinic, a laboratory, or another area) is shown. The environment 400 may contain outer walls 401 and inner walls 402. As described by the high-level flowchart block 100 of FIG. 1, one or more RF readers 300 may be placed in the environment. The readers 300 may have one or more antennas 303 and 303'. While the antennas 303 and 303' are illustrated as residing outside of the RF readers 300, it is apparent to one skilled in the art that the antennas 303 and 303' can also be integrated into the reader 300.

A number of items (e.g., the item 201 and container 202 of FIG. 2), belonging to one or more products the customer is subscribed to, are also distributed throughout the environment. Each item (405 and 406 and 410) is associated with a tag (e.g., the tags 200 of FIG. 2). These tags 200, which may be of various types, are read by a number of readers 300 having one or more associated antennas 303 and 303'. Tags of different types (for example, RFID tags and Bluetooth beacons) may be used concurrently at the environment 400. For the sake of brevity, the term "item" henceforth denotes both the item 201 and the associated tag 200.

Each antenna 303 and 303' has an associated RF range 408 and 409 (also henceforth known as "read range"). The read range corresponds to the area around the antenna 303 and 303' in which a tagged item 405 or 406 may be read by the antenna, and may be defined by a variety of shapes, sizes, or dimension (i.e., the RF range need not be circular or spherical), depending upon the nature of the antenna, the strength of the antenna, the gain pattern of antenna segment, transmit power of the RF reader 300, and the ability of the RF to penetrate the walls 400 and 401. For example, an omni-directional antenna 303 provides a circular read range 408, whereas a directional antenna 303' provides a more focused read range 409, and in this case focusing on a shelf 407 containing tagged items 405.

An item 410 may contain an active tag, such as a Bluetooth Low Energy beacon, and the active tag broadcasts an RF signal which an antenna such as 303 can read. The active tag on item 410 would have a broadcast range 411, with the distance of the range from the active tag on item 410 dependent on the signal strength of the transmitted RF signal. If an antenna is within the broadcasting range 411 of the active tag on item 410, it would be able to receive signals from the active tag on item 410. If an antenna is outside of the broadcasting range 411, the antenna would not be able to receive a signal from the active tag of item 410.

It is not uncommon for RF ranges 408 and 409 to overlap in real-world applications. Thus, as shown, one read range may overlap with another read range. Accordingly, it is possible for an item 405 to exist within the range of two or more readers 300, both of which may simultaneously sense the presence of that item 405. In addition, an item 406 may also be out of the reading range 408 and 409 of the RF readers 300. In addition, it is not uncommon for the broadcast range 411 of an active tag to encompass multiple antennas. Accordingly, two or more readers 300 can detect the same active tag. For the sake of brevity, the term "read range" henceforth denotes the maximum distance between an antenna and an active or passive tag, in any combination, that allows a reader 300 to reliably communicate with the tag. Thus, the term "broadcast range" henceforth is brought under the term "read range".

In addition, in an embodiment where readers 300 integrate readings of tags 200 over time before tallying the tags, then as the tag is moved from the read range of first reader to the read range of second reader, the tag would simultaneously appear to be in the read range of both first and second readers. In addition, a mobile reader may communicate with the same tag twice, at different time points, and would thus need to recognize that it is the same tag being read. Also, if a system employs more than one mobile readers, then a tag could also be read simultaneously by more than one mobile reader.

In an embodiment, to prevent the same item from being counted more than once if two or more readers 300 (whether mobile, stationary, or a combination thereof) both detect the item, one reader 300 could be designated as master and all other readers 300 in an environment designated as slaves. All slaves could send their detected tag information to the master, and the master could then integrate all of the detected tags from all readers 300, filter out repeat detections, to determine the quantity of each subscribed product. In another embodiment, all readers at an environment are peers to each other, and are all designated to process a subset of detected tags based on a pre-defined rule. For example, the first reader could be designated to process tags belonging to products 1 to n, and the second reader designated to process tags belonging to products n+1 to n+m, etc. Thus, each reader sends a subset of their detected tag information to the designated reader to handle. In another embodiment, the detected tag information of all readers 300 can be sent to the server 504 for processing, in which the server filters and processes the tag information. In yet another embodiment, the readers present at an environment could form a specialized distributed computing system, which effectively creates one super reader with many antennas. In this case, the super reader can filter out repeat reads of tags and calculate the amount of each subscribed product. One skilled in the art can recognize that arrangements of tag processing need not be limited to the above and can indeed encompass a wide variety of methods that are known in the art.

If the tags 200 are unique to the product, the filtering of tags can be done at the hardware level. If the tags 200 are unique to the instance, the logic level of the system would also be able to filter out tags based on the unique identifier associated with the tag 200. For example, if two or more tags 200 were detected to contain the same unique identifier, then they must be due to repeat readings of the same tag 200.

In addition, the RF readers 300 may also determine the specific locations of items 405 and 406. This capability arises from the existence of distinct read ranges 408 and 409 and an ability of RF reader 300 to interrogate the items through individual antennas 303 and 303'. Determining item locations to an exacting antenna position is well known in the art and need not be described in detail herein.

In dense urban environments, overlap between the read ranges 408, 409, and 411 belonging to two or more customers may be possible. For example, walls between two adjacent environments may not greatly attenuate the RF signals, and thus RF signals from an environment belonging to one customer may "bleed" into an environment belonging to another customer, and vice versa. To determine which customer an item belongs to, in one embodiment, customer information (such as a unique UserID assigned to each customer) may be directly encoded into the associated tags. In another embodiment, the customer information associated with a tag may be stored in a data store, such as in the UserID field of TagsTable 1705 of FIG. 17. A reader can then poll the data store to retrieve the customer information associated with any particular tag. With customer information available, the RF readers 300 can thus filter tags based on the associated customer information and thus would be able to only respond to tags belonging to the right customer.

FIG. 5 illustrates an example of a system architecture 500 for implementing a monitoring system in accordance with various embodiments. As will be appreciated, although an Internet-based environment is used for purposes of explanation, different environments may be used, as appropriate, to implement various embodiments. The system includes one or more RF readers 300 in an environment, which communicates with tags 200 within the environment using one or more antennas 303. The reader 300 is operable to send and receive requests, messages or information (e.g., using the networking module 301 of FIG. 3) to a server 504 over an appropriate network 501. The server 504 may store information relevant to the subscription system on a data store 505. In one embodiment, the server 504 provides the User Interface Module 506 (as illustrated in FIG. 5), while in another embodiment, the reader 300 provides the User Interface Module 506. In one embodiment, the server 504 provides a Supply Chain Module 507.

The network 501 can include any appropriate network that can be accommodated by the networking module 301 of FIG. 3. Briefly, such networks can include an intranet, the internet, a cellular network, a local area network, or any other network or combination thereof. Communication over the network can be enabled via wired or wireless connections and combinations thereof. Any number of additional and/or intervening switches, routers, servers and other network component may be present in the system. Components used for such a system can depend at least in part upon the type of network and/or environment selected. Protocols and components for communication via such a network are well known and will not be discussed herein in detail.

Each server 504 typically will include an operating system that provides executable program instructions for the general administration and operation of that server and typically will include computer-readable medium storing instructions that, when executed by a processor of the server 504, allow the server to perform its intended functions. Suitable implementations for the operating system and general functionality of the servers are known or commercially available and are readily implemented by persons having ordinary skills in the art. The server 504 can include any appropriate hardware and software as needed for integrating with the data store 505, for providing a User Interface Module 506, for providing a Supply Chain Module 507, and for handling any other data access and business logic that is needed in a practicable embodiment of the present invention. The server 504 can also provide access control services in cooperation with the data store 505.

Figure 15:
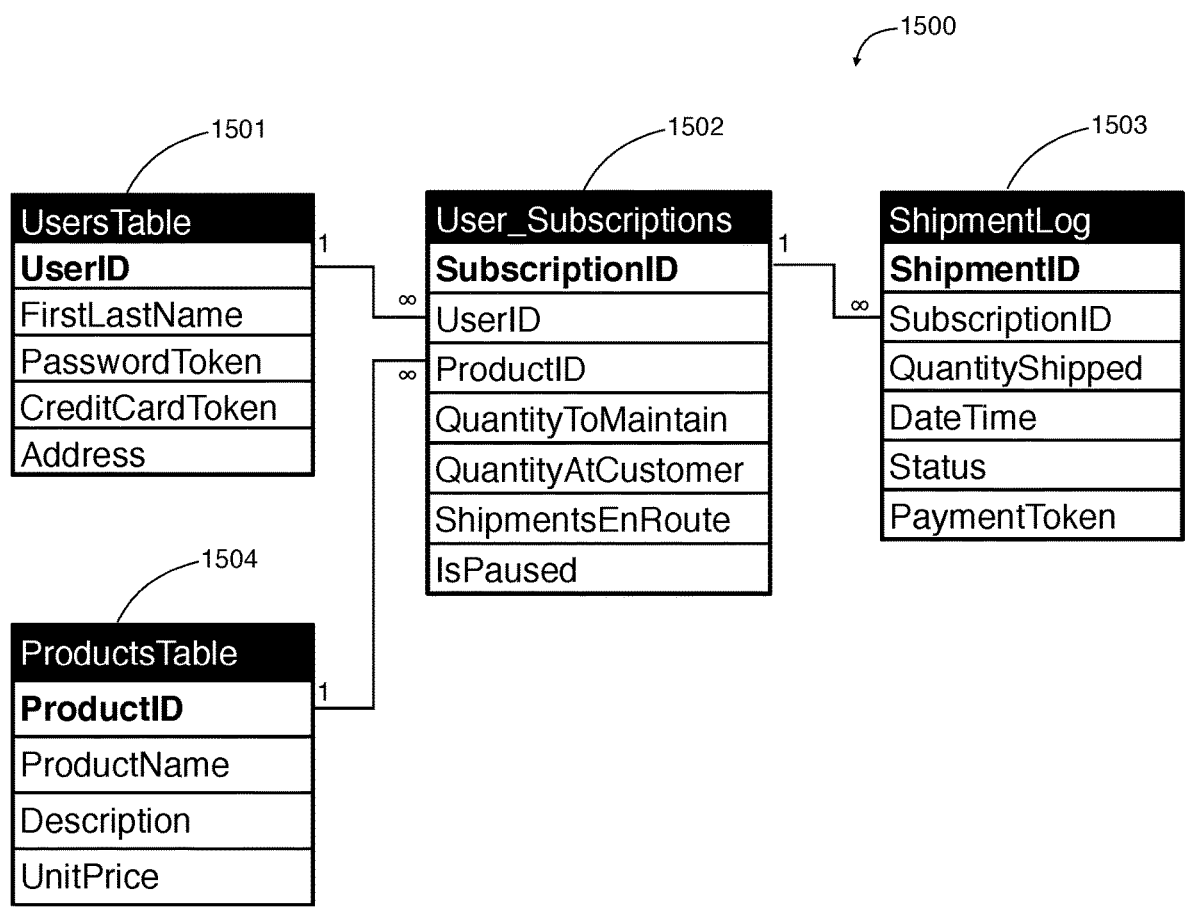
FIG. 15 depicts an example of a database schema compatible with tags that are unique to the product at the logic level of the system.
Figure 17:
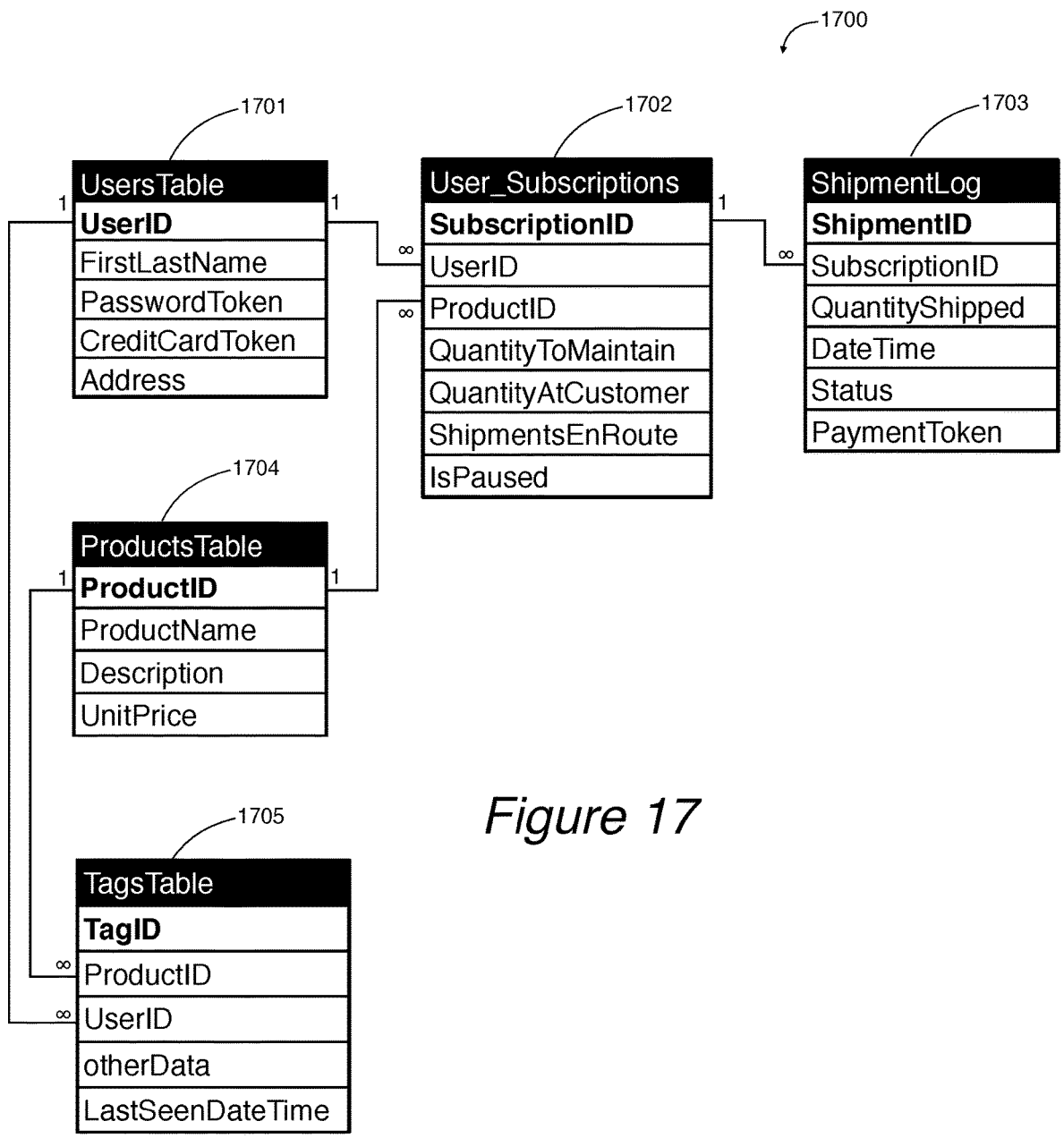
FIG. 17 depicts an example of a database schema compatible with tags that are unique to the instance at the logic level of the system.

As used herein the term "data store" 505 refers to any device or combination of devices capable of storing, accessing and retrieving data, which may include any combination and number of data servers, databases, data storage devices and data storage media, in any standard, distributed or clustered environment. The database may be implemented as a single, monolithic database or as a combination of two or more databases and/or data stored in another, non-database formats, such as files stored in any of various file formats. Database may be of any type, depending on implementation, including a relational database, an objected oriented database, a graph database, a document-based database, or combinations thereof. An example of the type of data that may be stored in the data store 505 is illustrated in FIGS. 15 and 17.

The User Interface Module (or simply "UI Module") 506 provides an interface via which a customer can manage their profile and subscriptions. The UI Module may provide a Graphical User Interface (GUI), a Natural Language User Interface (NLUI), a gesture-controlled interface, or combinations thereof. FIGS. 6 through 13 show possible examples of various GUIs and GUI elements as part of the UI Module 506. A NLUI interface involves natural voice processing where linguistic phenomena such as verbs, phrases and clauses act as UI controls for creating, selecting and modifying data in software applications. A gesture-controlled interface involves sensors that can interpret motion and gestures of the user to provide control of the subscription system.

We do not intend to limit the UI Module 506 to a particular medium, technology, or device. If the UI Module is provided over a network, the customers may interact with the UI using an electronic client device, which can include any appropriate device operable to send and receive requests, messages, or information over an appropriate network and convey information back to a user of the device. Examples of such client devices include personal computers, cell phones or smart phones, smart watches, smart glasses, or any other wearable device, hand-held messaging devices, laptop computers, set-top boxes, personal data assistants, electronic book readers, or any other device capable of providing the user interface.

As mentioned previously, the UI Module 506 can be provided either by the server 504 or by the reader 300. Providing the UI Module 506 by the server 504 may be advantageous because the UI Module may be accessed over the Internet, giving customers the convenience of managing their account anywhere with Internet access. Providing the UI Module 506 by the reader 300 may be advantageous for security related reasons. In this case, most of the data pertaining to products and subscriptions, some of which can be sensitive, can then be kept on-site with the reader 300, to reduce chances of information leaking into the outside world. The reader 300 can then make the UI Module 506 available on the local network, or perhaps directly on the reader 300 itself (for example, via a display module on the reader 300).

The Supply Chain Module 507 provides shipping and order fulfillment capabilities. In one embodiment, this module generates invoices, receipts, and/or processes shipments. The subscription enterprise may operate an order fulfillment network, in which the enterprise keeps inventory and processes shipments. Alternatively, or in addition to, another entity may operate and/or own the fulfillment network. In this case, shipment requests can be sent to the third-party distributor or vendor. In some embodiments, shipment requests may be consolidated over time and products are only shipped on a periodic (e.g., weekly or bi-weekly) schedule. In some embodiments, users can set how they wish shipments to be consolidated. In other embodiments, users may be levied a different fee depending on how they wish to consolidate their shipments.

In some embodiments, shipment requests can be approved (confirmed or rejected) by the user. For example, a user could be sent an email (or other method of communication) which gives the user an opportunity for a predefined duration to reject a shipment request and stop the relevant subscription. Upon inaction by the user and after the predefined duration has elapsed, the shipment is sent. Alternatively, the system can pause the subscription indefinitely until a user approves a potential shipment request. As another example, the system could also display a list of shipments waiting to be approved, and the user then approves the individual shipment requests by checking off the list.

While only one server 504 is illustrated in FIG. 5, it should be understood that there can be several servers 504, layers or other elements, processes or components, which may be chained or otherwise configured, which can interact to perform tasks such as obtaining data from an appropriate data store 505. Thus the system may be a distributed computing environment utilizing several computer systems and components that are interconnected via communication links, using one or more computer networks or direct connections.

In addition, although the system architecture 500 is illustrated with the server 504, the data store 505, and the reader 300 as separate entities, one of ordinary skill in the arts can understand that the entities, or components of the entities, may be combined into a single unit (i.e., combined into the RF reader device 300). For example, the reader 300 may include a server, implemented with software and/or hardware. Thus the depiction of the system 500 should be taken as being illustrative in nature, and not limiting to the scope of the disclosure.

FIGS. 6 through 13 illustrate examples of various graphical user interface (GUI) screens and user interface (UI) elements that may be provided to customers in at least some embodiments. The UI screens allow customers to manage their subscription and perform other functions related to the embodiments of the invention.

The UI screens and UI elements are provided with the intent to illustrate, to suggest, and to teach 1) possible information that may be provided to a customer, 2) possible information that may be obtained from a customer, and 3) possible user interaction paradigms, all of which may be useful to a subscription system. In other words, these UI screens and UI elements are given by way of example, and are not intended to be limiting. For example, in some embodiments, other UI screens than the example UI screens illustrated in the Figures may be provided.

In addition, with the teachings of FIGS. 6 through 13, one skilled in the art can easily build user interfaces that are based on NLUI and/or gesture, to capture and provide the same or similar type of information that is enabled by the illustrated GUI.

Figure 6:
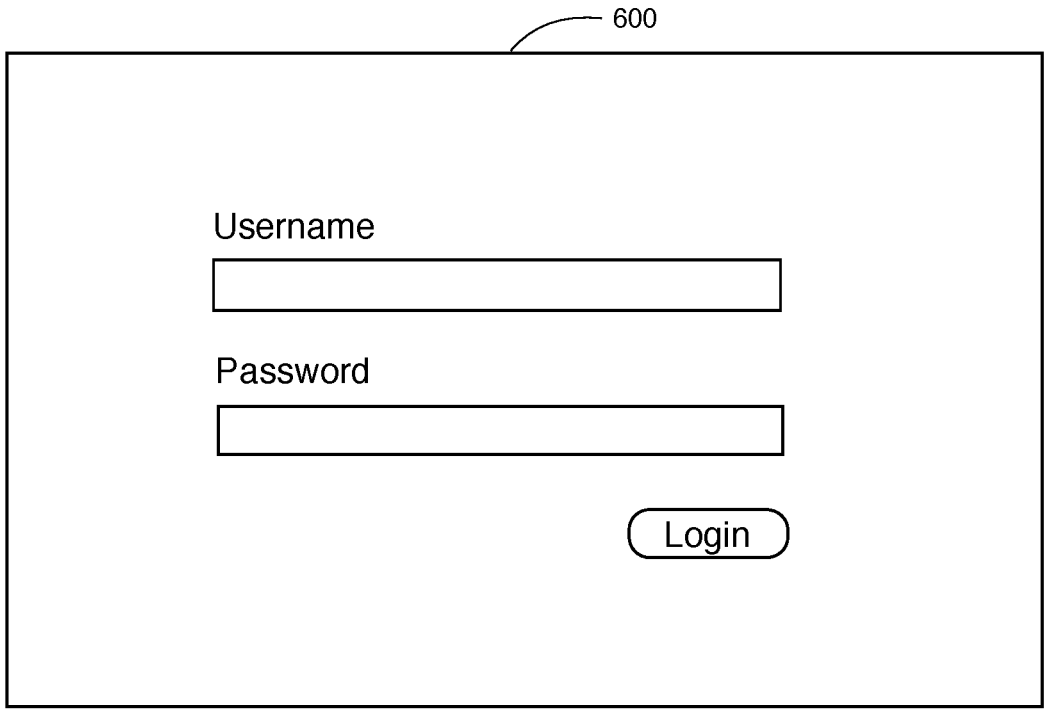
FIG. 6 depicts an example UI whereby a customer may authenticate and log into the monitoring system.

FIG. 6 depicts an example interface screen 600 whereby a customer may authenticate and log into the system. In at least some embodiments, customers may be required to already have, or to set up if they do not already have, a user account with the subscription system to receive and/or access at least some of the UI screens and UI elements illustrated in the FIGS. 7 through 13, and to use the subscription service described herein.

Figure 7:
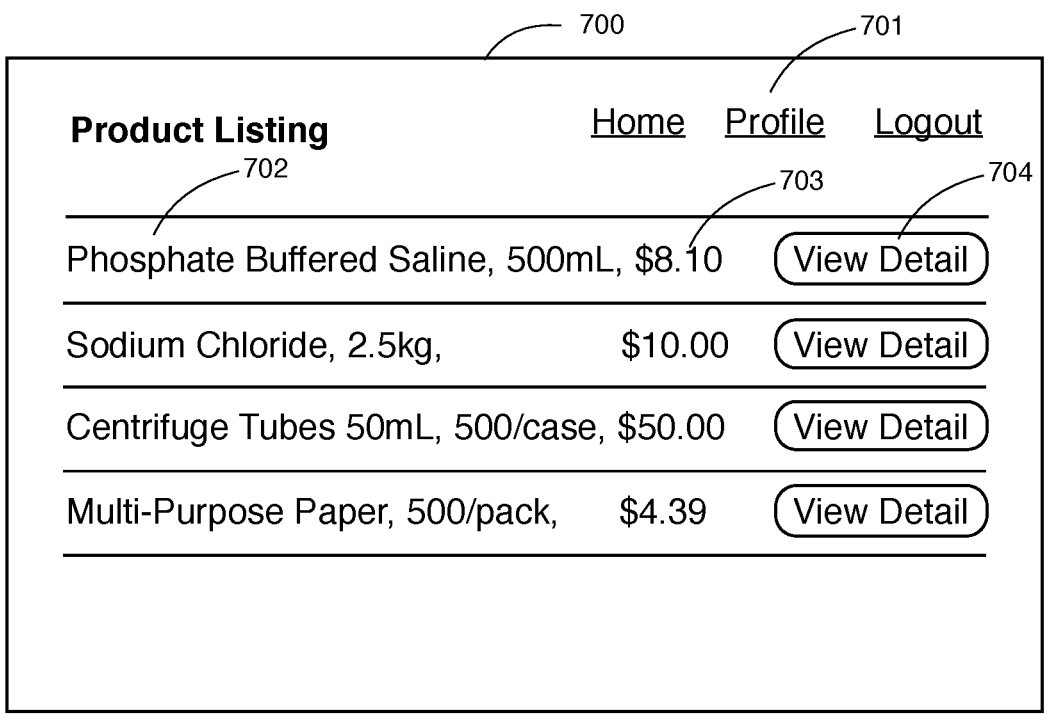
FIG. 7 depicts an example UI whereby a customer may browse the list of products that are available for subscription.

FIG. 7 depicts an example interface screen 700 whereby a customer may browse the list of products 702 that are available for subscription. Navigation 701 may include one or more UI elements, such as buttons, tab menus, etc., via which the customer may navigate to other screens of the subscription service and/or perform other functions, such as searches. The item listing 702 may include the price 703 of the products and include a UI element 704 such as a button to allow the customer to navigate to a screen showing the details (e.g. screen 800 of FIG. 8) of an item. In one embodiment, if the customer has already subscribed to a particular product, then the UI element 704 will take the customer to the subscription details screen (e.g., screen 1100 of FIG. 11), to prevent a customer from having multiple duplicate subscriptions to the same product.

In some embodiments, the products offered by the subscription enterprise may not be available for all customers. For example, in some embodiments, a product may only be offered in certain geographic locations, or a product may be available only to certain customers belonging to a particular group, enterprise, or institution. A consequence of the preceding is that different customers may see different lists of products available to them.

Similarly, in some embodiments, the products may be offered to some customers at lower cost, while being offered to other customers at a higher cost. For example, in some embodiments, customers in areas with relatively high population densities, such as cities or towns, may be offered the subscription service at lower cost, while customers in areas with lower population densities may be offered the subscription service at higher cost. In addition, if the subscribed items are shipped in a reusable shipping container, in some embodiments, the customer may be charged a nominal fee or deposit for each shipping container. In some embodiments, this fee or deposit may be refunded to the customer upon return of the container.

FIG. 8 depicts an example interface screen 800 showing details about a particular product via which customers can gain more information about a particular product. Such a screen may include detailed description 801 about the product as well as other relevant information such as the stock keeping unit (SKU) and pricing. In addition, the screen 800 also provides a means for allowing the customer to continue towards subscribing the product such as presenting a "Subscribe" button 802.

FIG. 9 depicts an example interface screen 900 that allows a customer to subscribe to a product. The customer may select the number of items to maintain at their environment 901. A customer may then submit the subscription using a UI element such as 902. Following the action to subscribe, the customer may be shown a screen to verify and confirm their subscription, along with a confirmation number, if applicable. The customer may then be taken to the product listing screen (e.g., FIG. 7), home screen, manage subscription screen (e.g., FIG. 10), or any other screen of the subscription service.

Figure 10:
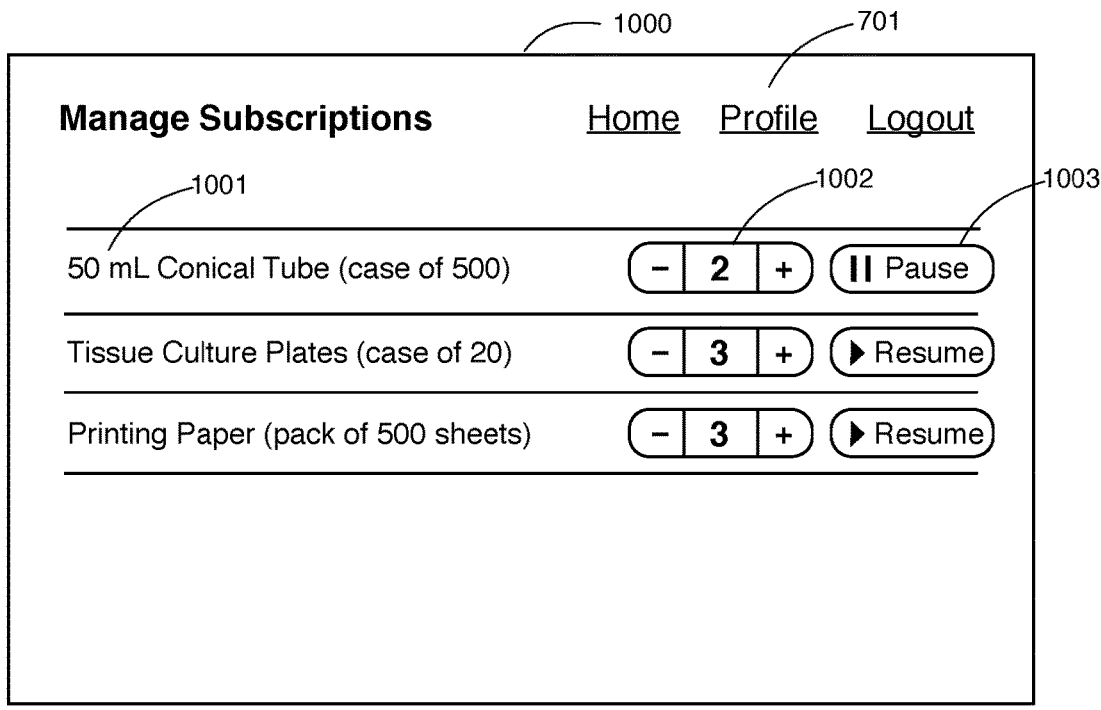
FIG. 10 depicts an example UI via which a customer can manage their existing subscriptions.

FIG. 10 depicts an example interface screen 1000 that allows a customer to manage their existing subscriptions. The customer may see a list of products 1001 they have subscribed to. The customer may also be given a means to conveniently manage their subscription, such as UI elements 1002 to control changing the number of items to maintain, as well as UI elements 1003 to control pausing and resuming the subscription.

Pausing the subscription allows the customer to temporarily suspend the maintenance of the minimum quantity of the subscribed product at the environment without having to remove the subscription entry from their subscription list 1001. In the event that pause is selected, the tags are still read if they are in the environment, but no action is taken if actual level decreases below desired level. If the subscription is resumed by pressing the button 1003, a comparison is made and if the levels are below desired levels, a shipment is requested. If the customer would need the item again in the future, pausing the subscription offers a more convenient alternative than cancelling the subscription outright. If the customer cancels a subscription, the customer would need to consult the product screen 700 of FIG. 7 to again find the product from the product list 702 of FIG. 7.

Figure 11:
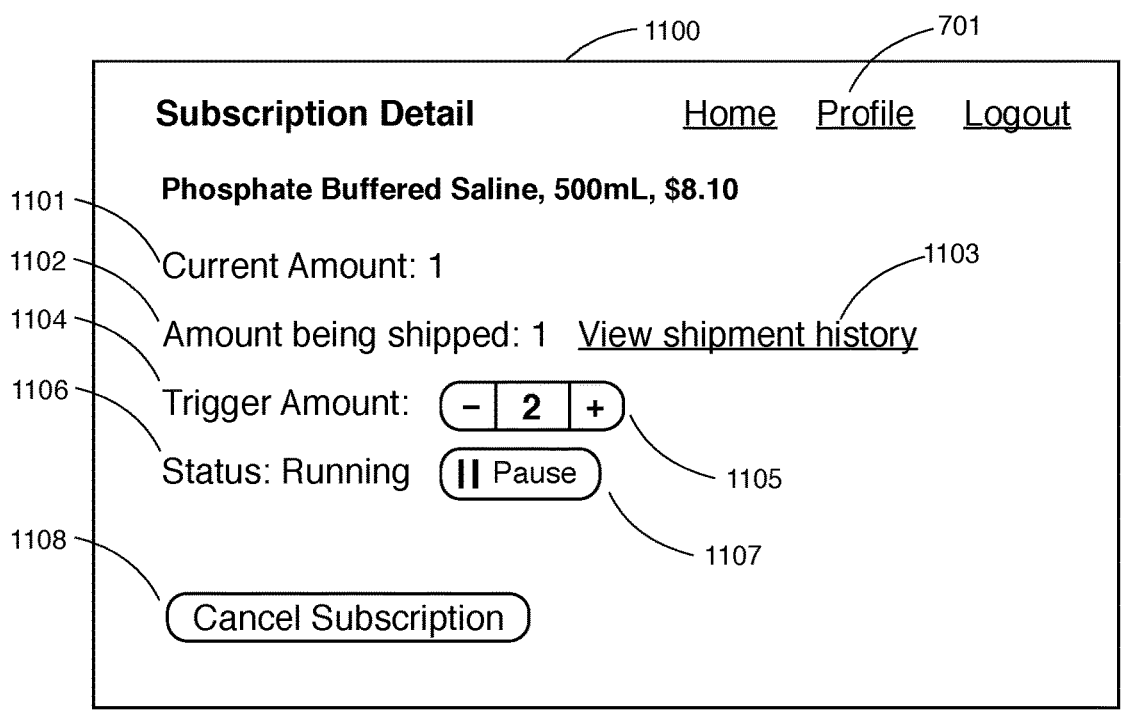
FIG. 11 depicts an example UI providing details about a particular subscription.

FIG. 11 depicts an example interface screen 1100 showing details about a particular subscription when a user has selected a subscribed product 1001 from FIG. 10. The screen 1100 may show the current quantity 1101 of items in the environment. The screen 1100 may display the number of items that are shipped 1102 and is en route to the customer. A UI element 1103 may also be present that allows the customer to view past shipment history (an example of which is illustrated in FIG. 12). The screen 1100 allows the customer to manage their subscription by viewing and setting the number of items to maintain at their environment 1104 with a UI element 1105. In addition, the screen 1100 may allow the customer to view the status of the subscription 1106 and may provide a UI element 1107 to control the status by either pausing or resuming the subscription. The UI element 1107 is illustrated as a button that can, with clicks or with other means of activating the button, alternate its action between pausing and resuming the subscription. The screen 1100 may also allow the customer to cancel the subscription with a UI element 1108.

FIG. 12 depicts an example interface screen 1200 showing information about past deliveries and in transit shipments.

FIG. 13 depicts an example interface screen 1300 allowing the customer to edit information associated with the customer, including, but not limited to, shipping address, billing address, and payment method information. The information may be used in the automatic processing of subscriptions to enable successful delivery of products to customers. In one embodiment, the customer may have provided customer information including, but not limited to, delivery/shipping address, billing address, and payment method information in the process of setting up a user account with the subscription service.

Those skilled in the art can understand that various other arrangements may exist with respect to application flow, choice of UI elements, positioning of UI elements, information provided, information collected, etc., that departs from the express or implied teachings of FIGS. 6 through 13. For example, although the login screen 600 of FIG. 6 is illustrated first, the customer may browse the products (e.g., 700 of FIG. 7), view details about the products (e.g., 800 of FIG. 8), and begin to subscribe the product (e.g., 900 of FIG. 9) without first needing to create an account and/or log into their account. In this alternative application flow, only when the customer presses the confirm subscription button 902 of FIG. 9 will the system prompt the customer for information and ask for account creation.

FIGS. 14 and 16 illustrate example processes 1400 and 1600, respectively, that can be utilized in accordance with various embodiments for determining the number of tagged items present in the environment, comparing with the number of items to maintain in the environment, and acting on the comparison. The details regarding the processes 1400 and 1600 are given below. It should be understood that there can be additional, fewer, or alternative steps performed in similar or alternative orders, or in parallel, within the scope of the various embodiments unless otherwise stated. In the illustrated examples, the steps are to be performed by the one or more RF readers (e.g., 300 of FIG. 3). However, those with ordinary skill in the art can understand that some or most of the steps may also be performed elsewhere, such as by the server 504 of FIGS. 14 and 16. For example, steps that involve calculation or comparisons may be performed on the server 504. For brevity, the network infrastructure (e.g., 501 of FIG. 5) is not shown in FIGS. 14 and 16.

In one or more embodiments, communication with the server 504 of FIGS. 14 and 16 may involve sending authentication information in addition to the data outlined in the blocks of the figures. As described previously, authentication information may contain access tokens, session data, cookies, and the like, and are well known to persons skilled in the art.

FIGS. 15 and 17 show illustrative database schemas 1500 and 1700, respectively, including fields for use with a system for providing a subscription service in accordance with various embodiments. The details regarding the database schemas 1500 and 1700 are described below.

The database schemas 1500 and 1700 are not intended to limit the invention to using a relational database. Rather, the schemas are intended to enable one skilled in the art to effortlessly build a data store for use with embodiments of the invention. The same or similar information contained in databases exemplified by the schemas 1500 and 1700 can be stored in various other forms, files, and/or databases, such as graph databases (e.g., Neo4J), document-oriented databases (e.g., MongoDB), key-value stores (e.g., Redis), column family stores (e.g., Cassandra), any other public or proprietary NoSQL database, comma-separated values, tab-separated values, XML files, plain text files, and the like.

Furthermore, it will be appreciated that although the tables, fields, linkages, keys, etc., included in FIGS. 15 and 17 are appropriate for the example embodiments, the invention is not so limited. For example, tables and/or fields may be used together with, or in place of, those given in FIGS. 15 and 17, and it will be appreciated that multiple connected databases may be used in place of the single database described below. In FIGS. 15 and 17, "key" fields (e.g., fields that uniquely identify a record and typically, but not always, link tables together) are given in bold. Although the figures include key fields in tables, it will be appreciated that in certain example embodiments other fields may serve as keys in place of, or in addition to, those identified. It also will be appreciated that in certain example embodiments, keys need not be maintained at all. Exemplary symbolic linkages between fields in different tables are shown by lines.

FIGS. 14 and 15 describe an embodiment of the subscription system in which tags 200 are unique to the product at the logic level of the system. This embodiment can be useful when an environment contains all stationary RF readers 300. Thus, one or more tags 200 present in an environment may share the same information. The only requirement is that the tags used with this embodiment contain information about which product the tag represents. This allows the system to track the number of items of each subscribed product. The following examples are meant to illustrate the ways tags can be associated with products, and are not meant to be limiting: 1) the tags can be encoded with product names, 2) the tags can be encoded with the unique identifiers assigned to products (such as the product ID), 3) the tags can be encoded with any string of information, which is associated with a product through a mechanism such as a lookup table.

FIG. 14 illustrates an example process 1400 of the embodiment. With reference to the block 1401, information about the subscriptions of a customer (e.g., subset of data contained in table User_Subscriptions 1502 of FIG. 15 and all associated data) will be received from the server 504 or otherwise obtained by the RF reader 300. The information can include, but is not limited to: information about the subscribed product, the value of the number of items to be maintained at the environment, the value of the current number of shipped items that are in transit to the customer, and whether the subscription is paused. The former two parameters can be stored on the device as quantityToMaintain and shipmentsEnRoute, respectively. Such parameters are also herein known as variables.

At block 1402, the RF module (e.g., 302 of FIG. 3) on the reader (e.g., 300 of FIG. 3) reads tags within its reading range. As described previously, if more than one reader is present in an environment, the readers can communicate via a network (e.g., using the networking module 301 of FIG. 3) to filter out tags being read multiple times. In such a case, the readers may read tags simultaneously or essentially simultaneously and pool the resulting tag information together.

In one embodiment, the system may check the information present on the tags 200 to ensure that the tag actually belongs to the subscription service and is not some other arbitrary tag, for example by some other service, that the customer may have brought into the environment. For example, the system can check to ensure the tag is associated with a valid product. If the tag is not associated with a valid product, the tag can be ignored by the system. In another embodiment, the tags may encode additional data fields such as the name of the enterprise providing the subscription service (or any other identifying information). Any tags lacking the particular identifying information can then be ignored by the system.

In one embodiment, tags 200 that are read by the reader 300 may be further filtered with the customer information associated with the tags, which can be encoded directly into the tag, to avoid reading and tallying tags belonging to a different customer. In an embodiment, this is implemented by cross referencing the UserID stored on tag 200 with the UserID associated and stored in memory of the reader 300. As mentioned previously, such a feature may be particularly important in a dense urban environment where RF ranges from different customers may overlap. Any tag that is associated with the wrong customer can be ignored and only tags belonging to the right customer is processed by block 1403.

At block 1403, the number of items of each subscribed product at the environment (i.e., the current Quantity variable for each subscribed product) is computed by tallying the tags present within the read range for each product. Thus, the system can construct a data structure such as a histogram of the products, determining the number of items for each product in the environment. The following example algorithm assumes a customer has subscribed to products 1 to n. Begin with product 1. For the first product, loop through all tags that are found by one or more readers, and increment a counter each time a tag is associated with product 1. After looping through all tags, current Quantity of product 1 is set to the value of the counter. Then reset counter. For the second product, loop through all tags that are found, increment counter each time a tag is associated with product 2. After looping through all tags, current Quantity of product 2 is set to the value of the counter. Reset counter. Repeat for all n products. The data generated at block 1403 is then stored in memory to be used for subsequent blocks. The aforementioned algorithm is intended to teach with clarity how a specialized computing system can determine the number of items of each product present in an environment. One skilled in the art can realize that many other algorithms and combinations thereof can also determine the number of items of each product present in an environment.

At block 1404, the system determines whether there are any increases in currentQuantity for any products (herein known as "deltaOfCurrentQuantity"), by looping through each product and calculating:

$$\text{deltaOfCurrentQuantity} = (\text{current Quantity of most recent read}) - (\text{current Quantity of previous read})$$

If deltaOfCurrentQuantity is zero or negative, the system moves to block 1407. On the other hand, if deltaOfCurrentQuantity is positive, the system moves to block 1405.

At block 1405, the system focuses on the products with positive deltaOfCurrentQuantity. A positive deltaOfCurrentQuantity potentially indicates that a customer has received shipments and that the number of shipped items that are still pending has decreased accordingly. Thus, for those products, shipmentsEnRoute is adjusted accordingly:

$$\text{shipmentsEnRoute} = \text{shipmentsEnRoute} - \text{deltaOfCurrentQuantity}$$

At block 1406, a shipment acknowledgement is then sent to the server 504. The system then moves to block 1407.

At block 1407, the system can first filter out the products that belong to subscriptions that are paused. The system then evaluates each remaining subscribed product, whether the combined number of items in the environment (current Quantity) and the number of items being shipped to the customer (shipmentsEnRoute) is greater than or equal to the value of the quantity of items that needs to be maintained (quantityToMaintain):

$$(\text{current Quantity} + \text{shipmentsEnRoute}) \geq \text{quantityToMaintain}$$

If the comparison is true, then there are enough items available in the environment and the system proceeds to block 1411. If the comparison is false, then one or more products have fewer than the required number of items in stock in the environment, and the system moves to block 1408.

At block 1408, the system focuses on the one or more products that need to be replenished. For each of those products, the system calculates the quantity of items (the quantityToShip variable) that needs to be shipped to satisfy the quantityToMaintain value. The quantityToShip equals the value of the difference between the quantity of items that needs to be maintained (quantityToMaintain) and the combined value of the number of items in the environment (current Quantity) and the number of items already being shipped to the customer (shipmentsEnRoute):

$$quantityToShip = quantityToMaintain - (currentQuantity + shipmentsEnRoute)$$

Since it does not make logical sense to ship a negative amount, if the quantityToShip value is negative, then the quantityToShip value is set to zero.

At block 1409, a shipment request is sent to the server 504 with the quantityToShip values of each product that needs to be replenished.

At block 1410, the system then updates the shipmentsEnRoute value of each product by increasing it with the quantityToShip value:

$$shipmentsEnRoute = shipmentsEnRoute + quantityToShip$$

At block 1411, an adjustable delay is built into the block to allow periodic scanning of tags. The delay may be 0 or greater. In an alternative embodiment, block 1411 can be omitted such that blocks 1407 and 1410 flow to 1402 without any delay. The parameter for the length of delay may be retrieved at block 1401 or the value may be pre-built into the system. Following 1411, the system then loops back to scanning tags 1402.

FIG. 15 is an illustrative database schema 1500 for use with an embodiment of a system for providing a subscription service in which tags 200 are unique to the product at the logic level of the system. The schema can be implemented by the data store 505 of FIG. 5. However, some or all of the tables and the associated data can also be stored on the reader 300 of FIG. 3. Storing some or all of the data on the reader provides a local cache, which can reduce server load and increase the efficiency of the subscription system.

The customer data is held in UsersTable 1501, products that are available for subscription are held in ProductsTable 1504. Information about the subscriptions of each customer is held in User_Subscriptions 1502, and the shipment history information is kept in ShipmentLog 1503.

In table UsersTable 1501, fields are shown to provide examples of the type of information about a customer that may be stored and is useful for a subscription system. For example, the field UserID is a unique identifier assigned to a customer. The system may collect the names of customers (i.e., for shipping and/or billing purposes), which it may store in the FirstLastName field. A user's password may be stored in the PasswordToken field. In addition, the user's password may be processed through a one-way hash, such as Bcrypt, into a token to be securely stored in the PasswordToken field. A user's credit card information may be stored at a secure location elsewhere and accessed through a credit card token that is stored in the CreditCardToken field. The address of a user may be stored in the Address field. Additional fields may optionally be included.

In table ProductsTable 1504, fields are shown to provide examples of the type of information that may be available about products that is useful for a subscription system. For example, the name of the product, a description about a product, and the price of a product may be stored in the fields ProductName, Description, and UnitPrice, respectively. Additional fields may optionally be included.

In table User_Subscriptions 1502, fields are shown to provide examples of the type of information that may be stored about the subscriptions of customers. For example, each subscription is given a unique identifier, stored in the SubscriptionID field. A subscription is also linked to a customer the subscription belongs to (stored in UserID field), as well as the product the subscription is about (stored in ProductID field). For each subscription, the system also remembers the number of items that should be kept at the customer (stored in QuantityToMaintain field), and may also store the number of items that are currently at the customer (stored in the QuantityAtCustomer field). Also, the system may remember the number of items that are being shipped to the customer (stored in the ShipmentsEnRoute field). In addition, the system can remember whether a subscription is paused (stored in the IsPaused field as true or false value). In addition, the system may also remember a delivery address or delivery location for each subscription (also stored as a field in User_Subscriptions 1502), to allow different subscriptions to be sent to different locations in an environment or to different environments belonging to the same user. Additional fields may optionally be included.

In table ShipmentLog 1503, fields are shown to provide examples of the type of information that may be stored about the shipment history and shipment details. When products are shipped, the information pertaining to the shipment and delivery is added to ShipmentLog 1503. Each entry is given a unique identifier, stored as ShipmentID. The field SubscriptionID enables the system to know which subscription the entry is for. The subscription system may record how many items were shipped together (stored in the QuantityShipped field), and the date and time shipment was made (stored in the DateTime field). In addition, a field named Status may be present in which to store the status of the shipment, whether shipment is still in transit, delivered, or cancelled. The field PaymentToken may also be present to record information about the payment for the shipment. Additional fields may optionally be included.

FIGS. 16 and 17 describe an embodiment that is compatible with tags that are unique to the instance at the logic level of the system. Thus, the one or more tags present in an environment each contain different information as each tag is uniquely identified. This embodiment is useful for both mobile and stationary RF readers. Since tags contain unique identifiers (herein known as "tag ID"), the tags can be associated with products with the use of lookup tables such as TagsTable 1705 of FIG. 17. This embodiment allows the system to track the number of items of each subscribed product. In an alternative embodiment, the product info or ProductID may be stored on the tag itself.

FIG. 16 illustrates an example process 1600 of the embodiment. With reference to the block 1601, information about the subscriptions of a customer (e.g., subset of data contained in table User_Subscriptions 1702 of FIG. 17 and all associated data) will be received from the server 504 or otherwise obtained by the RF reader device. The information can include, but is not limited to: information about the subscribed product, the value of the number of items to be maintained in the environment, the value of the current number of shipped items that are in transit to the customer, and whether the subscription is paused. The former two parameters can be stored on the device as the variables quantityToMaintain and shipmentsEnRoute, respectively. In addition, information about each tag linked to the customer (e.g., subset of data contained in table TagsTable 1705 of FIG. 17 and all associated data) may be obtained by the reader from the server 504 or through other means.

At block 1602, the RF module (e.g., 302 of FIG. 3) on the reader (e.g., 300 of FIG. 3) reads tags within its reading range. As described previously, if more than one reader is present in an environment, the readers can communicate via a network (e.g., using the networking module 301 of FIG. 3) to filter out tags being read multiple times. In such a case, the readers may read tags simultaneously or essentially simultaneously and pool the resulting tag information together.

Since the tags are uniquely identified, an embodiment of the system can store and keep track of each tag that has been read by the one or more readers in the environment, such as by storing the tag ID in a data structure, in data store either on the reader or on the server. An example of a data structure suitable for storing such data could be the table TagsTable 1705 of FIG. 17.

In an embodiment, the system can store and keep track of each tag that has been read and in addition, each tag at the time of reading will further be associated with a time stamp, which can be stored as the variable lastSeenDateTime. Thus, the time stamp represents the date and time an item is last "seen" by a reader. The time stamp may be Unix time, which is the number of seconds that have elapsed since Jan. 1, 1970. However, one skilled in the art can understand that any other representation of time can also be used. Using lastSeenInterval allows the system to check the latest polling at a later time and see whether a tag is still missing, thereby allowing the system to not trigger an immediate shipment request when a tag cannot be read by the one or more readers at the environment. As will become apparent below, this is advantageous if one or more readers present in the environment are mobile. This is also advantageous, for example, because it allows for the user to temporarily move an item out of an environment (or otherwise cause a tag from communicating with readers at the environment) and move it back within a short time without having to worry about a new shipment being triggered. In another example, it would allow a user to intend to use an item but return the item if they decide they do not actually need to use it. In yet another example, it would also allow for temporary failures in the reading of tags by the system or other glitches in the system.

In one embodiment, the system may check the information present on the tags to ensure that the tag actually belongs to the subscription service and is not some other arbitrary tag, for example by some other service, that the customer may have brought into the environment. For example, the system can use the tag ID and cross-reference to a product ID to determine whether the tag is associated with a valid product. In another embodiment, the tags may encode additional data fields such as the name of the enterprise providing the subscription service (or any other identifying information). Any tags lacking the particular identifying information will then be ignored by the system.

In one embodiment, tags that are read by the reader may be further filtered with the customer information associated with the tags (either encoded directly into the tag or stored in a data structure such as in TagTable 1705 of FIG. 17), to avoid reading and tallying tags belonging to a different customer. In an embodiment, this is implemented by cross referencing the UserID stored on tag 200 with the UserID associated and stored in memory of the reader 300. As mentioned previously, such a feature may be particularly important in a dense urban environment where RF ranges from different customers may overlap. Any tag that is associated with the wrong customer is ignored and only tags belonging to the right customer is processed by block 1606.

At block 1603, the system then determines whether any new tags are detected. This can be done by determining whether the current read has found any new tag IDs that were not present in the previous read. For example, the system can compare the tags interrogated by the most recent read with the list of tags that was interrogated by the previous read. If no new tags are detected, the system moves to block 1606.

If new tags are detected, the system moves to block 1604. One or more new tags that are found that validly are associated with the customer indicate that the customer has received new items and that the number of shipped items in transit to the customer has decreased accordingly. Thus, based on the tags attached to the items, the system determines which products the customer has received. In some embodiments, the product ID can be encoded in the tag. In other embodiments, the product ID can be contained in the data store such as in the ProductID field of TagTable 1705 of FIG. 17. Using the product ID, the system is able to determine how many items of which products have been received. For those products, the system then decreases the value of shipmentsEnRoute by the number of new tags belonging to the product. At block 1605, a shipment acknowledgement is then sent to the server 504. The system then moves to block 1606.

At block 1606, if all of the one or more readers present in the environment are stationary, the number of items for each product in the environment (i.e., the current Quantity variable for each subscribed product) can be computed by tallying the tags present within the read range. Thus, the system can construct a data structure much like a histogram of the products, determining the number of items of each product present at in the environment. The following example algorithm assumes a customer has subscribed to products 1 to n. Begin with product 1. For the first product, loop through all tags that are found by the one or more readers, and increment a counter each time a tag is associated with product 1. After looping through all tags, current Quantity of product 1 is set to the value of the counter. Then reset counter. For the second product, loop through all tags that are found, increment counter each time a tag is associated with product 2. After looping through all tags, current Quantity of product 2 is set to the value of the counter. Reset counter. Repeat for all n products. The data generated at block 1606 is then stored in memory to be used for subsequent blocks. The aforementioned algorithm is intended to teach with clarity how a specialized computing system can determine the number of items of each product present in an environment. One skilled in the art can realize that many other algorithms and combinations thereof can also determine the number of items of each product present in an environment.

However, if one or more readers in the environment are mobile readers, then there is a possibility that not all tags can be communicated with during a single read. Thus, the system cannot gain a tally of all tags in an environment at any given time. Instead, the system needs to account for tags that have been read recently but can no longer be read because the customer has moved the reader, and therefore the reading range has moved elsewhere. Thus the system stores and keeps track of all the tags that have been read over time (e.g., block 1602) and makes use of the variable lastSeenDateTime, which represents the date and time a tag was last "seen" by a reader. A tag is assumed to be in the environment if the tag has recently been read by a reader, even if the tag cannot be currently detected. How recent a tag must be interrogated for the system to assume that it is still in the environment can be determined by an adjustable interval (lastSeenInterval). The following equality provides an example of a calculation that can be used to determine whether a tag qualifies as being on-site. According to the example, the variables currentTimestamp and lastSeenDateTime can be expressed as Unix time and lastSeenInterval in seconds.

(currentTimestamp−lastSeenInterval)≤lastSeenDateTime

If the comparison is true then the tag is assumed to be on-site. If the comparison is false then the time of last read is older than allowed by lastSeenInterval and the tag is assumed by the system to have been discarded or used.

Employing more than one mobile reader in an environment could be advantageous if the environment is large relative to the read range between a reader 300 and a tag 200. For example, if the methods and processes of a reader 300 are incorporated into mobile computing devices such as smartphones or smart-watches or smart-glasses, then a small number of employees in an office building can monitor an entire office floor to automatically detect that an amount of a product has fallen below a threshold amount and the system would in response automatically trigger a shipment of additional product.

Having determined which tags are assumed to be in the environment, the system can then determine the number of items for each product in the environment by constructing a data structure similar to a histogram of the products. The following example algorithm assumes a customer has subscribed to products 1 to n. Begin with product 1. For the first product, loop through all tags stored by the system belonging to the customer. Increment a counter each time a tag is associated with product 1 and the tag qualifies as being on-site based on its lastSeenDateTime. After looping through all tags, current Quantity of product 1 is set to the value of the counter. Then reset counter. Repeat for all n products. The data generated at block 1606 is then stored in memory to be used for subsequent blocks. The aforementioned algorithm is intended to teach with clarity how a specialized computing system can determine the number of items of each product present in an environment if one or more readers in the environment are mobile. One skilled in the art can realize that many other algorithms and combinations thereof can also determine the number of items of each product present in an environment.

At block 1607, the system can first filter out the products that belong to subscriptions that are paused. The system then evaluates each remaining subscribed product, whether the combined value of the number of items in the environment (current Quantity) and the number of items being shipped to the customer (shipmentsEnRoute) is greater or equal to the value of the quantity of items that needs to be maintained (quantityToMaintain):

(current Quantity+shipmentsEnRoute)≥quantityToMaintain

If the comparison is true, then there are enough items available in the environment and the system proceeds to block 1611. If the comparison is false, then one or more products have fewer than the required number of items in stock in the environment, and the system moves to block 1608.

At block 1608, the system focuses on the one or more products that need to be replenished. For each of those products, the system calculates the quantity of items (the quantityToShip variable) that needs to be shipped to satisfy the quantityToMaintain value. The quantityToShip equals the value of the difference between the quantity of items that needs to be maintained (quantityToMaintain) and the combined value of the number of items in the environment (currentQuantity) and the number of items being shipped to the customer (shipmentsEnRoute):

quantityToShip=quantityToMaintain−(current Quantity+shipmentsEnRoute)

Since it does not make logical sense to ship a negative amount, if the quantityToShip value is negative, then the quantityToShip value is set to zero.

At block 1609, a shipment request is sent to the server 504 with the quantityToShip values of each product that needs to be replenished.

At block 1610, the system then updates the shipmentsEnRoute values of each product by increasing it with the quantityToShip value:

shipmentsEnRoute=shipmentsEnRoute+quantityToShip

At block 1611, an adjustable delay is built into the block to allow periodic scanning of tags. The delay may be 0 or greater. In an alternative embodiment, block 1611 can be omitted such that blocks 1607 and 1610 flow to 1602 without any delay. The parameter for the length of delay may be retrieved at block 1601 or the value may be built-in into the system. Following 1611, the system then loops back to scanning tags 1602.

FIG. 17 is an illustrative database schema 1700 for use with an embodiment of a system for providing a subscription service compatible with tags that are unique to the instance at the logic level of the system. The schema can be implemented by the data store 505 of FIG. 5. However, some or all of the tables and the associated data can also be stored on the reader 300 of FIG. 3. Storing some or all of the data on the reader provides a local cache, which can reduce server load and increase the efficiency of the subscription system.

The customer data is held in UsersTable 1701, products that are available for subscription are held in ProductsTable 1704. Information about the subscriptions of each customer is held in User_Subscriptions 1702, and the shipment information is kept in ShipmentLog 1703. The information about tags can be kept in TagsTable 1705.

In table UsersTable 1701, fields are shown to provide examples of the type of information about a customer that may be stored and is useful for a subscription system. For example, the field UserID is a unique identifier assigned to a customer. The system may collect the names of customers (i.e., for shipping and/or billing purposes), which it may store in the FirstLastName field. A user's password may be stored in the PasswordToken field. In addition, the user's password may be processed through a one-way hash, such as Bcrypt, into a token to be securely stored in the PasswordToken field. A user's credit card information may be stored at a secure location elsewhere, can be accessed through a credit card token, which is stored in the CreditCardToken field. The address of a user may be stored in the Address field. Additional fields may optionally be included.

In table ProductsTable 1704, fields are shown to provide examples of the type of information that may be available about products that is useful for a subscription system. For example, the name of the product, a description about a product, and the price of a product may be stored in the fields ProductName, Description, and UnitPrice, respectively. Additional fields may optionally be included.

In table User_Subscriptions 1702, fields are shown to provide examples of the type of information that may be stored about the subscriptions of customers. For example, each subscription is given a unique identifier, stored in the SubscriptionID field. A subscription is also linked to a customer the subscription belongs to (stored in UserID field), as well as the product the subscription is about (stored in ProductID field). For each subscription, the system also remembers the number of items that should be kept at the customer (stored in QuantityToMaintain field), and may also store the number of items that are currently at the customer (stored in the QuantityAtCustomer field). Also, the system may remember the number of items that are being shipped to the customer (stored in the ShipmentsEnRoute field). In addition, the system remembers whether the subscription is paused (stored in the IsPaused field as true or false value). In addition, the system may also remember a delivery address or delivery location for each subscription (also stored as a field in User_Subscriptions 1702), to allow different subscriptions to be sent to different locations in an environment or to different environments belonging to the same user. Additional fields may optionally be included.

In table ShipmentLog 1703, fields are shown to provide examples of the type of information that may be stored about the shipment history and shipment details. When products are shipped, the information pertaining to the shipment and delivery is added to ShipmentLog 1703. Each entry is given a unique identifier, stored as ShipmentID. The field SubscriptionID enables the system to know which subscription the entry is for. The subscription system may record how many items were shipped together (stored in the QuantityShipped field), and the date and time shipment was made (stored in the DateTime field). In addition, a field named Status may be present in which to store the status of the shipment, whether shipment is still in transit, delivered, or cancelled. The field PaymentToken may also be present to record information about the payment for the shipment. Additional fields may optionally be included.

The table TagsTable 1705 is provided as an example for a means to store tag-related information in a database. TagsTable 1705 allows the system to store information about individual tags. The field TagID stores the identifier assigned to a tag. The field ProductID relates the item affixed with the tag to a particular product. The field UserID indicates which customer the tagged item belongs to. The field otherData is given as an example to show that any arbitrary data associated with a tag can be stored in the database, rather on the tag itself. This feature can be advantageous when tags have limited writable memory, thus limiting the amount of information that may be encoded into the tag. The field LastSeenDateTime can store the date and time when the tag has been read by a reader. This field is useful when one or more readers in an environment are mobile. Additional fields may optionally be included.

Descriptions of the embodiments illustrated in FIGS. 14 through 17 are not meant to be limiting. Rather, the examples are meant to teach, in detail and with clarity, the range of possibilities and environments that are compatible with the subscription system described herein.

FIGS. 18 through 23 illustrate examples of ways in which tags may be prevented from communicating with or being read by the RF reader.

Figure 18:
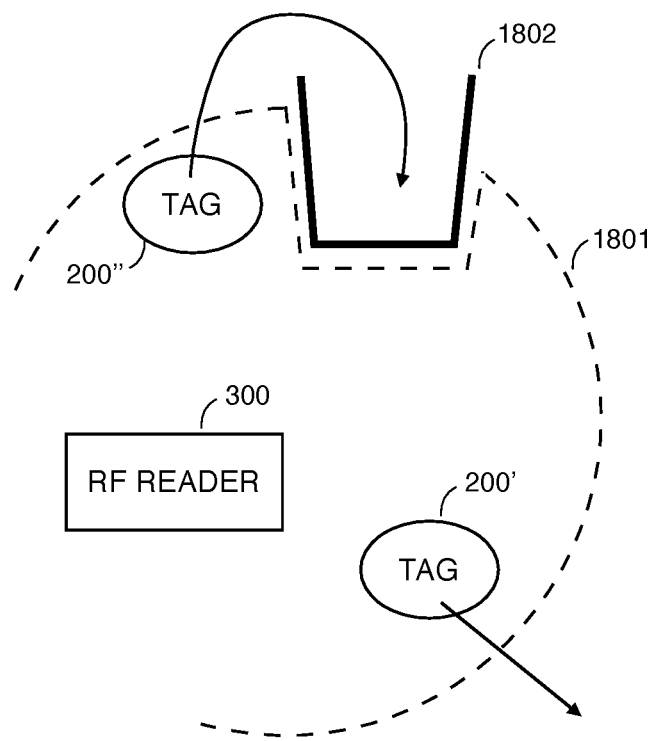
FIG. 18 depicts an example of tags being moved to a location in which they cannot communicate with the RF readers.

FIG. 18 illustrates examples of tags being moved out of the reading range of the RF reader. A reader 300 has a reading range 1801 (e.g., 408 or 409 of FIG. 4). The tag 200' may be moved out of the reading range, preventing it from being read by the reader. A shielded container or compartment 1802 with walls that are impervious to RF signals is illustrated. Placing a tag 200" within this container 1802 would prevent the RF reader 300 from communicating with the tag 200".

When an item is consumed, it is very natural for the item to be tossed into a garbage bin, for example, and eventually be taken off-site along with the rest of the garbage. The method illustrated in FIG. 18 benefits from the aforementioned very intuitive and routine action to trigger new rounds of shipments for the customer. Since the item is tossed away and moved off-site, so is the tag 200' that is attached to the item. Thus, the tag 200' is moved out of the reading range 1801, and shipment can be triggered.

Similarly, the garbage bin itself may be shielded, such as the shielded container 1802 illustrated in FIG. 18. When an item is tossed into the shielded container 1802, communication with the RF reader 300 is lost and shipment can be triggered. Such a shielded container can provide the benefit of triggering shipments sooner than waiting for the garbage to be taken out of the environment.

Figure 19:
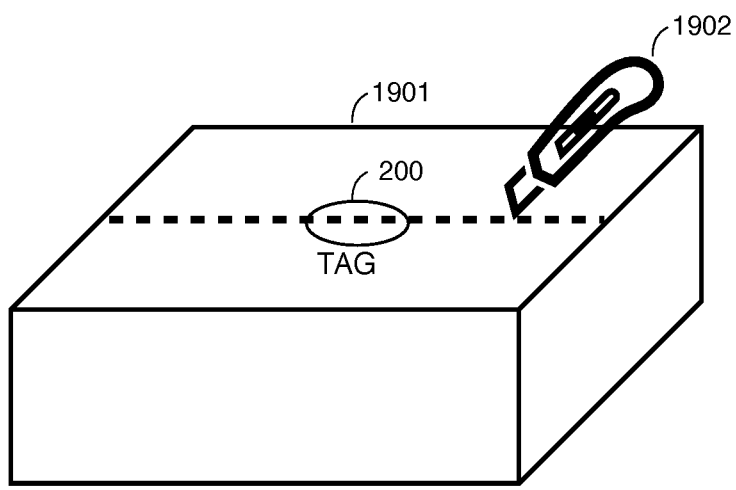
FIG. 19 depicts an example of a tag being destroyed to prevent it from communicating with RF readers.

FIG. 19 is intended to provide an example of a tag 200 being placed in such a way on a container 1901 that the act of opening the container naturally and effortlessly leads to the termination of the tag, such as being cut by a utility knife 1902. However, one with ordinary skill in the art can understand that a tag 200 can be destroyed by many other means possible, such as tearing or ripping the tag apart in the course of opening the container. The arrangement illustrated in FIG. 19 can be useful if the intent is to trigger a new round of shipment when a container is opened (e.g., to maintain a certain number of unopened containers with the customer). In addition, the method of destroying the tag as illustrated in FIG. 19 can be useful, for example, if the tag is inexpensive.

Figure 20:
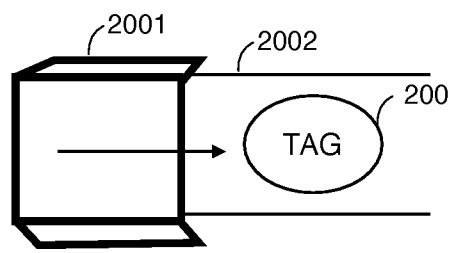
FIG. 20 depicts an example of a reusable tag, which can be prevented from communicating with an RF reader by sliding an RF shield over the tag.

FIG. 20 illustrates an example of a device having a configuration in which an RF shield 2001 rides on a guide rail 2002. The shield 2001 can be pushed over a tag 200 to shield as shown into a shielding position to prevent the tag from communicating with a RF reader. In a practical implementation, for example, this device may be attached to a reusable storage container. Such a storage container may also be a shipping container. Items of the same product type can be shipped in this reusable storage container to the customer. At this point, the tag 200 is unshielded due to the shield 2001 being in an unshielding position. When the container is delivered, the customer can then use the container as a storage container for the items contained within. When the customer wants to receive a new shipment, the customer simply manipulates the shield 2001 by sliding it over the tag 200 into its shielding position to trigger a new round of shipment.

Figure 21:
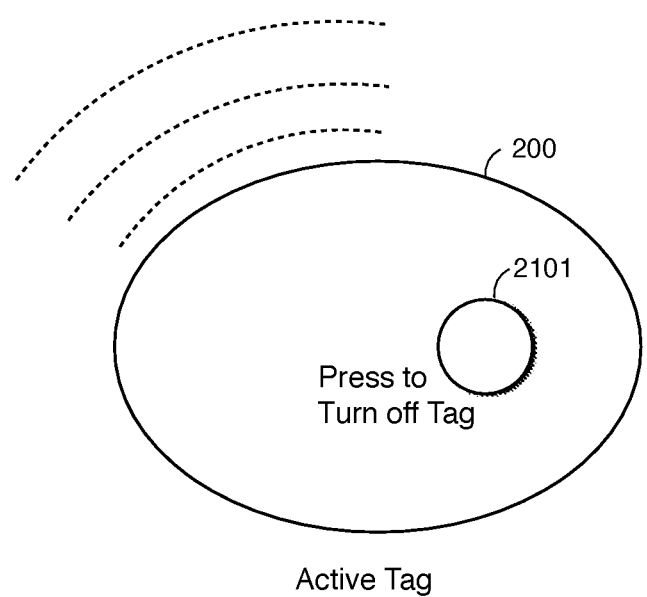
FIG. 21 depicts an example of a reusable active tag, which can be turned off by pressing a button that is present on the tag.

FIG. 21 illustrates an active tag 200, which can be turned off by pressing an off button 2101 that is present on the tag. In this example, the active tag 200 contains a battery, a physical button, as well as the required circuitry to transmit RF signals. An example of a practical implementation can be similar to that described for FIG. 20. Briefly, the active tag can be attached to a container, which contains items of the same product type. When the customer wants to trigger a new round of shipment, the customer simply turns the tag 200 off by pressing the off button 2101.

Figure 22A:
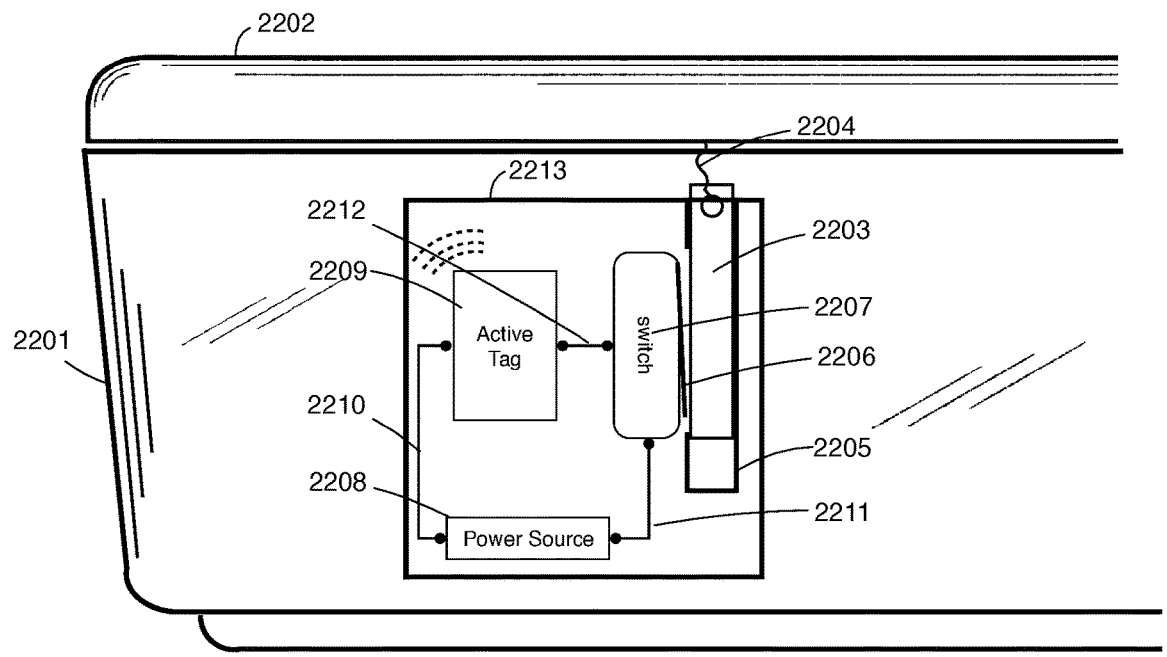
FIGS. 22A, 22B, 22C, 22D, 22E, and 22F depict an example of a reusable active tag attached to a container, and being turned off when opening the container, by disconnecting power to tag, via an electrical switch.
Figure 22B:
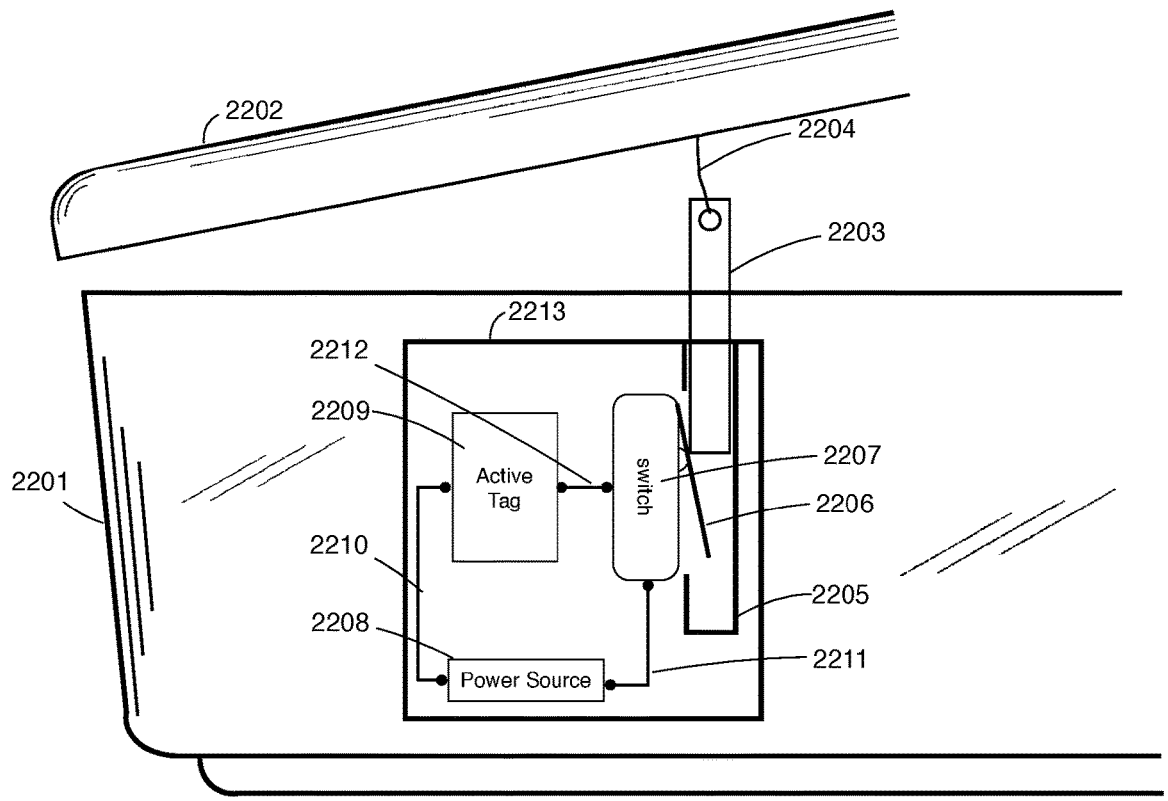

FIGS. 22A and 22B illustrate an embodiment of an active tag, which can be turned off through the natural process of opening a container, by providing a disabling mechanism that, under certain conditions, breaks temporarily or permanently the electric connection between the tag and its power source. FIG. 22A shows a container 2201 with a lid 2202. The lid 2202 may be removable from the container 2201, may be attached to the container 2201 and can flip open, or may provide another means of closing the container 2201 that is well known in the field. A rod 2203 is attached/tied to the lid 2202 via a string 2204 or some other long and flexible material. Prior to delivery such as at the warehouse of the enterprise providing the subscription service or a third party vendor or supplier, the rod 2203 is inserted into a slot formed by guide walls 2205 and the container 2201 is closed with the lid 2202. The guide walls 2205 ensure that the rod 2203 is positioned in such a way that the rod 2203 presses against the lever 2206 of an electrical switch 2207. The electrical switch 2207 may be a miniature snap-action switch, also known as a micro switch, or any other electrical switches that can respond to the presence of the rod 2203 to complete the electrical circuit between the power source 2208 and the active tag 2209. In the example illustrated by FIG. 22A, the power source 2208 is a battery and one terminal of the power source 2208 is directly connected to the tag 2209 via the wire 2210. The other terminal of the power source 2208, however, is connected first to the electrical switch 2207 via the wire 2211 and then to the tag 2209 via the wire 2212. Only when the lever 2206 is pushed against the switch 2207 will the switch 2207 complete the circuit, allowing the active tag 2209 to be powered by the power source 2208 and send RF signals. In one embodiment, the components may be placed in a case 2213 to protect the components.

FIG. 22B illustrates the ability of the active tag 2209 to stop sending RF signals when the container 2201 is opened by moving the lid 2202. As the lid 2202 is moved, it tugs on the string 2204, which in turn pulls the rod 2203 out of the slot formed by the guide walls 2205. The removal of the rod 2203 allows the lever 2206 to extend away from the electrical switch 2207. This action turns the switch 2207 off, breaking the electrical connection between the battery 2208 and the active tag 2209. Since the active tag 2209 is no longer powered by the battery 2208, it no longer sends RF signals.

The slot formed by the guide walls 2205 is small. Therefore the rod 2203 is unlikely to naturally re-insert into the slot when the lid 2202 is placed on the container 2201 again. This ensures that the tag 2209 turns off when the container 2201 is opened and remains off even when the user places the lid 2202 back onto the container 2201. Only when the rod 2203 is manually re-inserted into the slot will the tag 2209 start sending RF signals again.

Figure 22C:
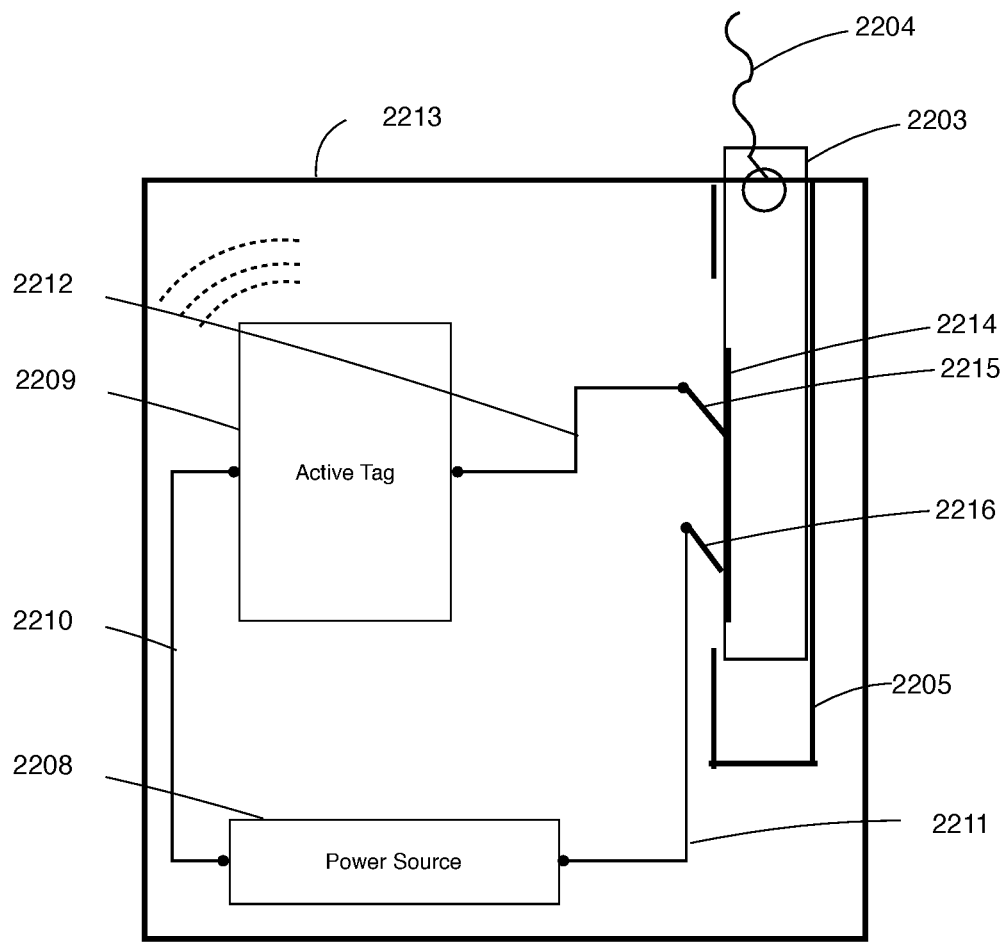

One with ordinary skill in the art can realize that while a miniature snap-action switch is shown to represent the electrical switch 2207, many other components and arrangements can enable similar functionalities. For example, FIG. 22C illustrates the use of a rod 2203 with conductive properties to bridge the electrical connection between the tag 2209 and the power source 2208. For the sake of clarity, the container and lid are not shown. The rod 2203 may be coated with a conductive material or plated with a conductive sheet such as copper tape, to create an electrically conductive surface 2214. Alternatively, the rod 2203 may be constructed with a conductive material, such as a metal, and therefore be intrinsically conductive. In place of the electrical switch 2207 of FIGS. 22A and 22B, metallic plates 2215 and 2216 with conductive properties join the wires 2212 and 2211, respectively. When the rod 2203 is inserted into the cavity formed by the guide walls 2205, the metallic plates 2215 and 2216 would be able to touch the conductive surface 2214 of the rod 2203 to complete the electrical circuit between the active tag 2209 and its power source 2208.

Figure 22D:
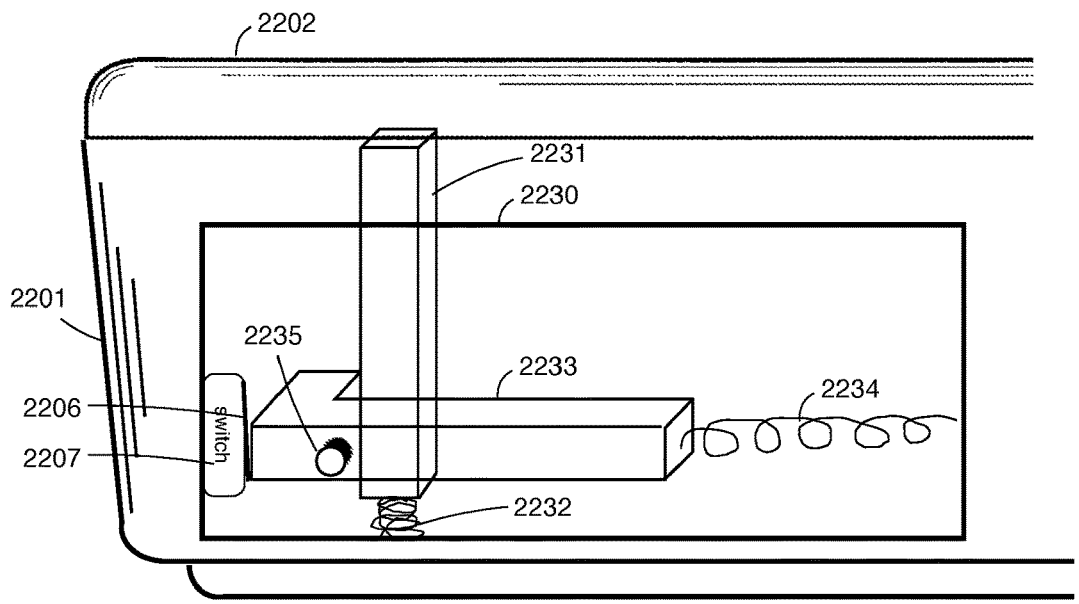
Figure 22E:
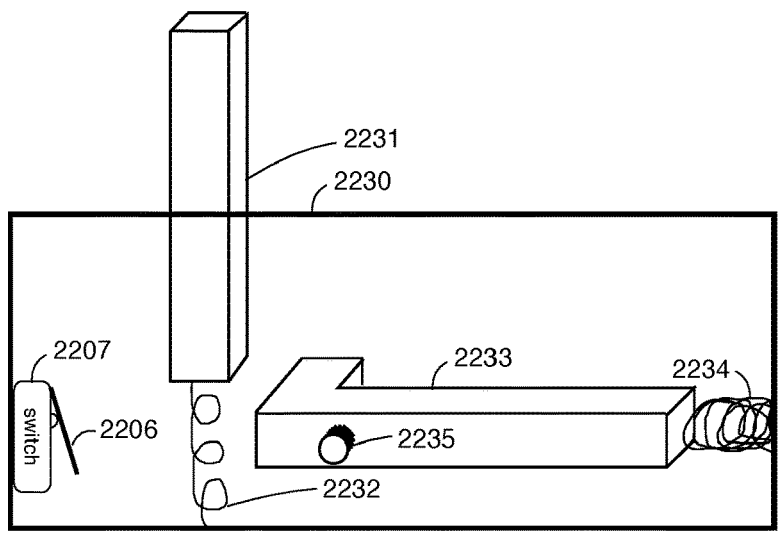
Figure 22F:
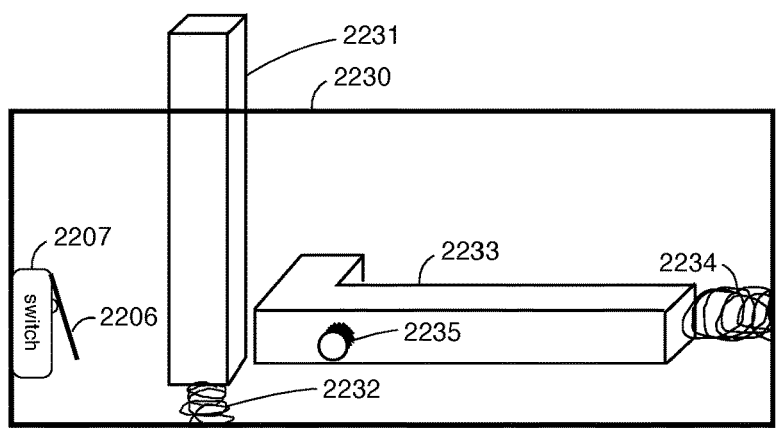

FIGS. 22D, 22E, and 22F are illustrated to show another embodiment of an apparatus to break the electric connection between a tag and its power source, through the natural process of opening a container, thereby turning off the tag. FIG. 22D illustrates the state of the components when the container 2201 is shipped to the customer. The components of the apparatus may be encased by an enclosure 2230. A vertical bar 2231 is attached to the bottom of the enclosure 2230 with a compression spring 2232. When the container 2201 is shipped to the customer, the lid 2202 that sits on the container pushes against the vertical bar 2231, thereby compressing the compression spring 2232. In contrast to the rod 2203 of FIG. 22A, the vertical bar 2231 is not attached to the lid 2202 and may not be pulled out of the enclosure 2230. Instead, the vertical bar 2231 protrudes out of the enclosure 2230 much like a push button: the vertical bar 2231 can be pushed down and the compression spring 2232 pushes the bar back up. A horizontal L-shaped part 2233 is attached to the side of the enclosure 2230 with an extension spring 2234. The extension spring 2234 is extended and the L-shape of the horizontal part 2233 reaches around the vertical bar 2231, thus allowing the horizontal part 2233 to be locked in place by the vertical bar 2231. For the sake of clarity, guide walls that ensure the vertical bar 2231 can only travel in the vertical direction and the horizontal part 2233 only in the horizontal direction are not illustrated. With the horizontal part 2233 extended, it pushes against the lever 2206 of an electrical switch 2207, which completes the electrical circuit between an active tag and its power source. For the sake of clarity, the active tag and the power source are not illustrated.

FIG. 22E illustrates the scenario when the lid is removed from the container. For the sake of clarity, the container and the lid are not illustrated. When the lid is removed, the compression spring 2232 can now push the vertical bar 2232 up, leaving enough space for horizontal mobility of the L-shaped horizontal part 2233. The extension spring 2234 can now pull the horizontal part 2233 to the side of the enclosure 2230. The horizontal part 2233 no longer pushes against the lever 2206 of the electrical switch 2207, thereby breaking the electrical connection between the active tag and its power source.

FIG. 22F illustrates that even when the lid is replaced on the container, which pushes the vertical bar 2231 back down, the horizontal L-shaped part 2233 remains pulled to the side by the extension spring 2234. The lever 2206 is not compressed and the switch 2207 remains off. A knob or handle 2235 on the horizontal part 2233 allows a user to manually extend the horizontal part 2233, to again be locked into place by the vertical bar 2231, thereby resetting the apparatus.

Figure 23A:
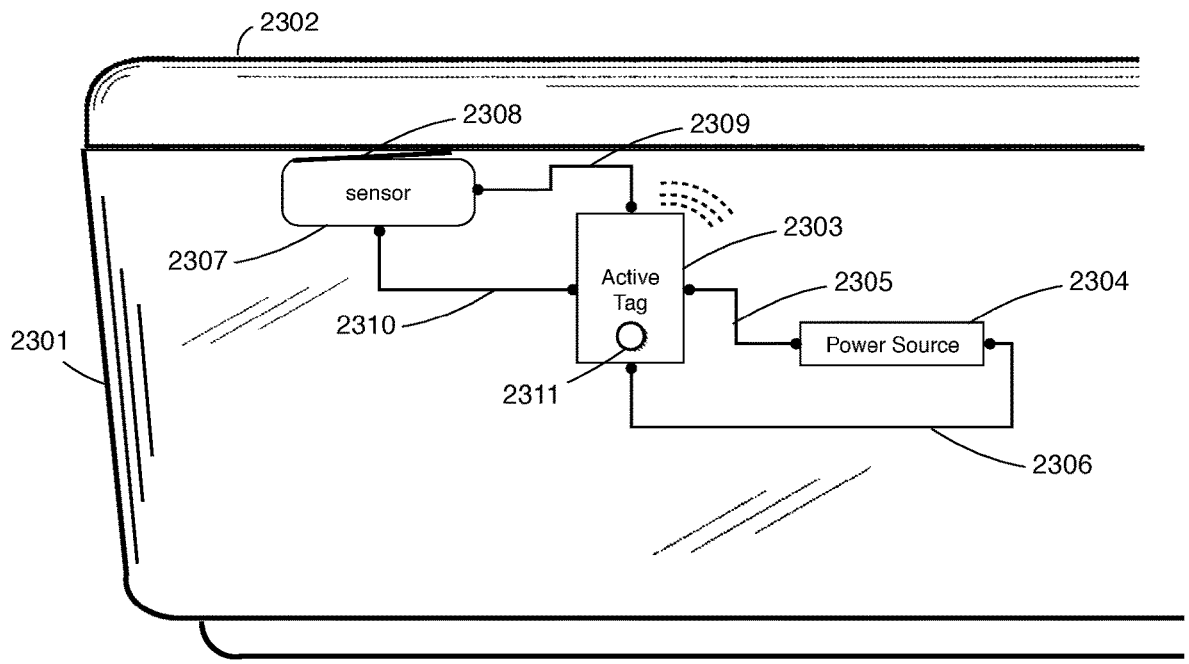
FIGS. 23A and 23B depict another example of a reusable active tag attached to a container, and being turned off when opening the container, via processor structure logic employing a sensor to detect the opening of the container.
Figure 23B:
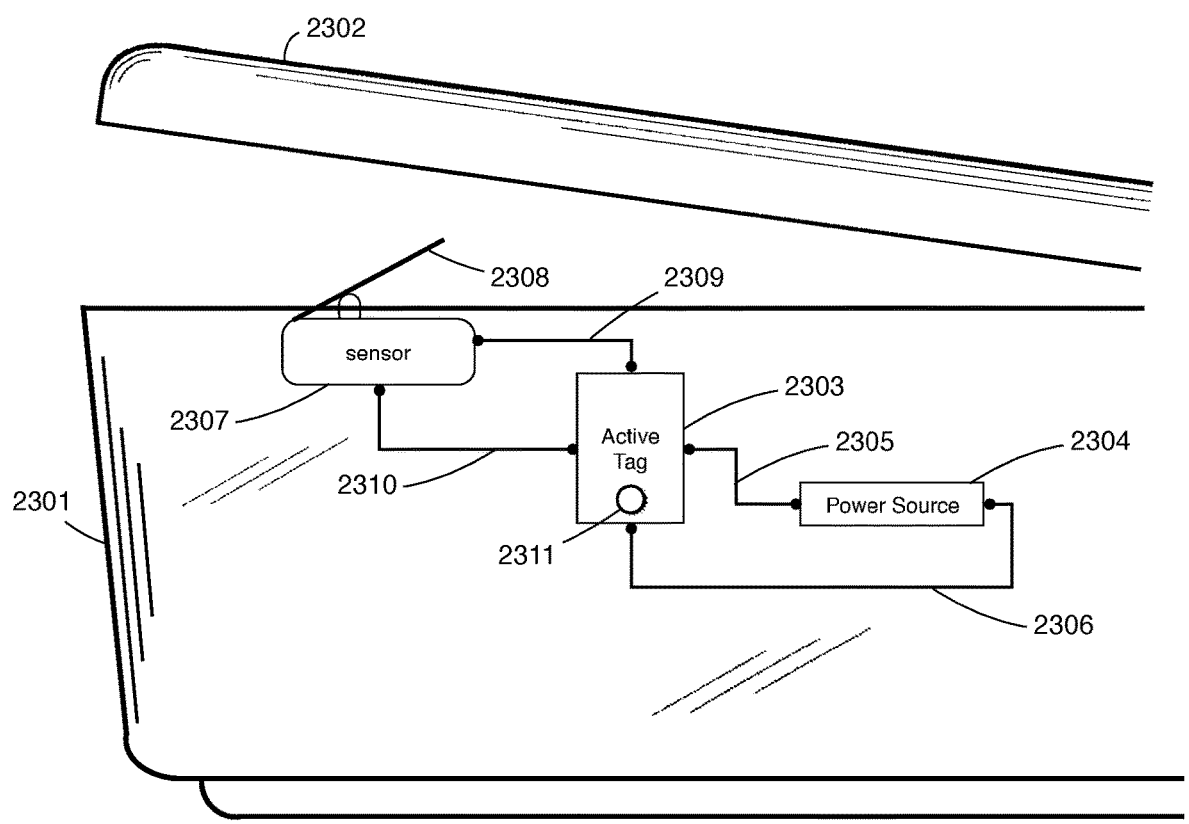

FIGS. 23A and 23B illustrate an embodiment of an active tag, and being turned off through the natural process of opening a container by providing a disabling mechanism that, under certain conditions, temporarily or permanently causes the tag to stop communicating without actually breaking an electrical connection. Thus, logic carried out on specialized processing structure on the active tag detects, using a sensor, the opening of a container, and turns off the broadcasting of RF signals even though power is still supplied to the active tag. FIG. 23A shows a container 2301 with a lid 2302. The lid 2302 may be removable from the container 2301, may be attached to the container 2301 and flip open, or may provide another means of closing the container 2301 that is well known in the field. An active tag 2303 is attached to the container 2301 and is powered at all times by a power source 2304 via the wires 2305 and 2306. The processing structure on the active tag 2303 is configured to check a sensor 2307 that responds to the opening of the lid 2302. The sensor 2307 may be a physical switch or a proximity sensor that emits an electromagnetic field or a beam of electromagnetic radiation (e.g., infrared) and looks for changes in the field or return signal. The sensor 2307 may be a capacitive sensor, photoelectric sensor, or use some other technology that is well known in the field to help it sense the removal of the lid 2302 from the container 2301. In the embodiment shown by FIG. 23A, the sensor 2307 is a miniature snap-action switch with an associated lever 2308, which is depressed when the lid 2302 sits on the container 2301. The switch 2307 is connected to the circuitry of the active tag 2303 via the wires 2309 and 2310. When the container 2301 is delivered to the customer, the tag 2303 is actively sending RF signals and the lever 2308 of the switch 2307 is pressed by the lid 2302.

FIG. 23B illustrates the ability of the active tag 2303 to stop sending signals when the container 2301 is opened by moving the lid 2302. As the lid 2302 is moved, it allows the lever 2308 to extend away from the switch 2307, which causes a break in the electrical signal, an event that can be detected by the circuitry of the active tag 2303. Upon detecting the break in electrical signal, the active tag 2303 is configured to stop sending RF signals. The active tag 2303 is configured to only resume sending RF signals when a physical button 2311 is pressed. This ensures that the tag 2303 turns off when the container 2301 is opened and remains off even when the customer places the lid 2302 back onto the container 2301. Only when the button 2311 is manually pressed will the tag 2303 reset and start sending RF signals again.

While at least one embodiment has been presented in the foregoing detailed description, it should be appreciated that a vast number of variations exist. It should also be appreciated that the embodiment or embodiments are only examples, and are not intended to limit the scope, applicability, or configuration of the invention in any way. Rather, the foregoing detailed description will provide those skilled in the art with a convenient road map for implementing the embodiment or embodiments. It should be understood that various changes can be made in the function and arrangement of elements without departing from the scope of the invention as set forth in the appended claims and legal equivalents thereof.

What is claimed is:

1. A monitoring system configured to automatically detect that an amount of items in an environment has fallen below a threshold amount and in response automatically trigger a shipment of one or more of said items, wherein the system comprises: a plurality of items; a tag associated with each of said plurality of items; the threshold amount associated with each of said plurality of items, wherein the threshold amount is set by a respective user associated with each plurality of items; wherein the system is configured to monitor when the amount of at least one of the plurality of items drops below the threshold amount of said at least one of the plurality of items and trigger the shipment of one or more of the at least one of the plurality of items independent of the amounts of the other plurality of items.

2. The monitoring system of claim 1, comprising: a processor executing instructions for generating and/or operating a user interface that permits the user to set the threshold amount.

3. The monitoring system of claim 2, wherein the processor generates a control in the user interface enabling the user to temporarily suspend an automatic triggering of an order message for a selected plurality of items, and wherein the processor sets a flag to note that the selected plurality of items is temporarily suspended.

4. The monitoring system of claim 1, wherein the tag is an RF tag, and one or more RF readers positioned to communicate with the RF tags.

5. The monitoring system of claim 4, wherein each item is selected from a group consisting of: an instance of a product, a group of objects, and a container containing one or more objects.

6. The monitoring system of claim 4, wherein each RF tag is associated with a class of items.

7. The monitoring system of claim 4, wherein each RF tag is associated with an instance of an item.

8. The monitoring system of claim 4, wherein the system is configured to, prior to triggering the shipment, confirm from multiple communications with the RF tags by the one or more RF readers, that the amount of the items in the environment has fallen below the threshold amount prior to triggering the shipment.

9. The monitoring system of claim 4, in which at least one RF reader is a portable RF reader.

10. The monitoring system of claim 4, wherein the system is configured to trigger the shipment only in an event all of the one or more RF readers are no longer able to communicate with one or more of the RF tags.

11. A device comprising: an RF tag operable to communicate with at least one RF reader and configured to be associated with a container; and a disabling mechanism electrically associated with the RF tag and configured to be physically associated with a lid of the container, the disabling mechanism when physically associated with the lid of the container disabling the RF tag from communicating with the at least one RF reader in an event that the lid of the container is opened by breaking a wired electrical connection between the RF tag and a power source for the RF tag.

12. The device of claim 11, wherein the disabling mechanism disables the RF tag from communicating by causing a processor of the RF tag to stop communicating.

13. The device of one of claim 11 or 12, wherein the disabling mechanism is configured to temporarily disable the RF tag from communicating.

14. The device of claim 13, wherein the disabling mechanism is manipulable to re-enable the RF tag to communicate.

15. The device of claim 11, wherein the disabling mechanism comprises: a rod configured to be connected to the lid of the container; a slot configured to be connected to a body of the container and dimensioned to slidingly receive the rod; a switch electrically connected between the power source and the RF tag, the switch comprising an actuating lever associated with the slot that is depressed while the rod is received within the slot thereby to permit the power source and the RF tag to be electrically connected, wherein the actuating lever is released while the rod is out of the slot due to the container having been opened thereby to break the electrical connection between the power source and the RF tag.

16. The device of claim 15, wherein the rod is dimensioned to require physical manipulation by a user in order to be received within the slot.

17. A device comprising:
an RF tag operable to communicate with at least one RF reader and configured to be associated with a container; and
a disabling mechanism electrically associated with the RF tag and configured to be physically associated with a lid of the container, the disabling mechanism when physically associated with the lid of the container disabling the RF tag from communicating with the at least one RF reader in an event that the lid of the container is opened; and wherein the disabling mechanism comprises:

a sensor electrically associated with the RF tag and said sensor associated with the lid of the container thereby to enable the RF tag to detect whether the lid of the container has been opened, wherein the RF tag is configured to disable its communicating upon detecting that the lid of the container has been opened;

a button electrically associated with the RF tag and manipulable by a user for re-enabling the RF tag to communicate in an event that the lid of the container is replaced.

* * * * *